(12) United States Patent
Irie et al.

(10) Patent No.: US 7,974,735 B2
(45) Date of Patent: Jul. 5, 2011

(54) LASER TOOL ROBOT SYSTEM WITH COORDINATED DRIVE SHAFT CONTROL

(75) Inventors: Toshimitsu Irie, Fukuoka (JP); Ryuichi Morita, Fukuoka (JP); Seigo Nishikawa, Kitakyushu (JP); Akio Sato, Aichi (JP); Takeshi Ikeda, Aichi (JP)

(73) Assignees: Kabushiki Kaisha Yaskawa Denki, Kitakyushu-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 538 days.

(21) Appl. No.: 11/721,408

(22) PCT Filed: Dec. 8, 2005

(86) PCT No.: PCT/JP2005/022575
§ 371 (c)(1),
(2), (4) Date: Jun. 11, 2007

(87) PCT Pub. No.: WO2006/062167
PCT Pub. Date: Jun. 15, 2006

(65) Prior Publication Data
US 2008/0161964 A1 Jul. 3, 2008

(30) Foreign Application Priority Data

Dec. 10, 2004 (JP) .................. 2004-358830
Aug. 24, 2005 (JP) .................. 2005-243351

(51) Int. Cl.
*G06F 19/00* (2011.01)
(52) U.S. Cl. .............. 700/245; 318/568.11; 318/568.13; 700/251; 700/252

(58) Field of Classification Search .................. 700/166, 700/61, 159, 160, 186, 189, 245, 250–252, 700/262–264; 219/121.63, 121.61, 121.62, 219/121.75, 121.78, 121.79, 121.8; 318/568.11, 318/568.21, 567, 568.15, 568.19, 573; 901/2, 901/14, 16, 20, 29, 42
See application file for complete search history.

(56) References Cited

U.S. PATENT DOCUMENTS
4,621,333 A * 11/1986 Watanabe .................... 700/257
4,650,952 A    3/1987 Akeel
(Continued)

FOREIGN PATENT DOCUMENTS
CN        1701901 A    11/2005
(Continued)

OTHER PUBLICATIONS

Gunnar Bolmsjo, Magnus Olsson, & Per Cederberg. (2002). Robotic arc welding—trends and developments for higher autonomy. The Industrial Robot, 29(2), 98-104. Retrieved Aug. 25, 2009, from ABI/INFORM Global. (Document ID: 208417991).*

(Continued)

*Primary Examiner* — Albert Decady
*Assistant Examiner* — Dave Robertson
(74) *Attorney, Agent, or Firm* — Sughrue Mion, PLLC

(57) ABSTRACT

A robot system includes s a robot (1) which moves a tool (3) attached to an end of the robot (1) by driving a robot drive shaft. The tool (3) applies a laser beam inputted from a laser oscillator (5) by drive of the tool drive shaft to an object. A robot control device (2) controls the robot drive shaft and the tool drive shaft in synchronization.

18 Claims, 15 Drawing Sheets

U.S. PATENT DOCUMENTS

| | | | |
|---|---|---|---|
| 4,689,756 A * | 8/1987 | Koyama et al. | 700/252 |
| 4,831,316 A * | 5/1989 | Ishiguro et al. | 700/254 |
| 4,835,710 A * | 5/1989 | Schnelle et al. | 700/262 |
| 4,879,663 A * | 11/1989 | Fuehrer | 700/250 |
| 5,302,802 A * | 4/1994 | Fujinaga et al. | 219/121.78 |
| 5,379,367 A * | 1/1995 | Song | 700/52 |
| 5,396,160 A * | 3/1995 | Chen | 318/573 |
| 5,438,522 A * | 8/1995 | Crovella | 700/189 |
| 5,602,968 A * | 2/1997 | Volpe | 700/262 |
| 5,887,122 A * | 3/1999 | Terawaki et al. | 700/258 |
| 5,925,271 A * | 7/1999 | Pollack et al. | 219/121.74 |
| 6,167,328 A * | 12/2000 | Takaoka et al. | 700/264 |
| 6,430,472 B1 * | 8/2002 | Boillot et al. | 700/245 |
| 6,657,156 B2 * | 12/2003 | Kubota et al. | 219/121.63 |
| 7,103,499 B2 * | 9/2006 | Goodwin et al. | 702/152 |
| 7,130,718 B2 * | 10/2006 | Gunnarsson et al. | 700/254 |
| 7,248,940 B2 * | 7/2007 | Neumann et al. | 700/166 |
| 7,560,659 B2 * | 7/2009 | Menin | 219/121.64 |
| 2002/0104834 A1 | 8/2002 | Mangiarino et al. | |
| 2005/0150876 A1 * | 7/2005 | Menin et al. | 219/121.63 |
| 2006/0175301 A1 * | 8/2006 | Rippl | 219/121.8 |
| 2007/0221638 A1 * | 9/2007 | Yoshikawa et al. | 219/121.63 |

FOREIGN PATENT DOCUMENTS

| | | | |
|---|---|---|---|
| EP | 1179382 A2 * | 2/2002 | |
| JP | 61-150793 A | 7/1986 | |
| JP | 63-140788 A | 6/1988 | |
| JP | 2002-301585 A | 10/2002 | |
| JP | 2003-230975 A | 8/2003 | |
| JP | 2004-174709 A | 6/2004 | |

OTHER PUBLICATIONS

Huissoon, J.. (2002). Robotic laser welding: seam sensor and laser focal frame registration. Robotica, 20(3), 261-268. Retrieved Aug. 25, 2009, from ProQuest Computing. (Document ID: 1402820191).*

M. Nyström and M. Norrlöf: Path generation for industrial robots, Mekatronikmöte 2003, Göteborg, Aug. 27-28, 2003.*

Mikael Norrlöf, "Path and trajectory generation, a lecture in the Ph.D. Course Robot Modeling and Control", Division of Automatic Control, Dept. of E.E. Linköpings universitet, 2003, [retrieved on Aug. 25, 2009] from the Internet <URL:http://www.control.isy.liu.se/student/graduate/robot/fall2003/pathamdtrajgen2003.pdf>.*

Angeles, J.; Rojas, A.; Lopez-Cajun, C.S., "Trajectory planning in robotic continuous-path applications," Robotics and Automation, IEEE Journal of , vol. 4, No. 4, pp. 380-385, Aug. 1988.*

Voliotis, S.D., "Orientation planning in continuous path applications for wrist partitioned manipulators," Control Theory and Applications, IEE Proceedings D , vol. 139, No. 6, pp. 495-502, Nov. 1992.*

Jouaneh, M.K.; Wang, Z.; Dornfeld, D.A., "Trajectory planning for coordinated motion of a robot and a positioning table. I. Path specification," Robotics and Automation, IEEE Transactions on , vol. 6, No. 6, pp. 735-745, Dec. 1990.*

Chinese Office Action dated Dec. 19, 2008.

* cited by examiner

FIG. 4(a)

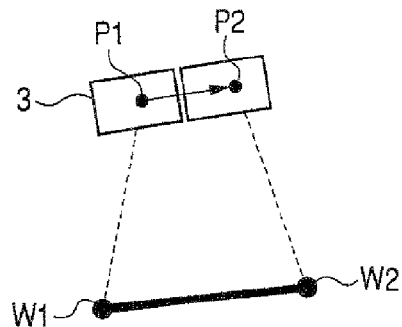

FIG. 4(b)

```
《  WELDING OF LINE INTERPOLATION IS PERFORMED
   ALONG WELDING LINE FROM W1 TO W2 WHILE CONTROL  》
        POINT OF ROBOT IS MOVED FROM P1 TO P2

MOVL ··· WELDING START POINT:
              P1 POSITION (ROBOT 6 AXIS) + W1 POSITION (LASER HEAD 2 AXIS)
CRLASON CSF#1 ··· WELDING START COMMAND
     MOVL ··· WELDING END POINT:
              P2 POSITION (ROBOT 6 AXIS) + W2 POSITION (LASER HEAD 2 AXIS)
CRLASOF CEF#1 ··· WELDING END COMMAND
```

FIG. 5

| LASER WELDING START CONDITION FILE #1 | | |
|---|---|---|
| INTERPOLATION TYPE | LINE INTERPOLATION | |
| | CIRCULAR ARC INTERPOLATION | |
| WELDING SPEED | 9.3 | m/min |
| WELDING CONDITION NUMBER | 12 | |
| ANALOG INSTRUCTION VALUE 1 | 3.0 | V |
| ANALOG INSTRUCTION VALUE 2 | 7.0 | V |
| SLOPE TIMER | 0.06 | sec |

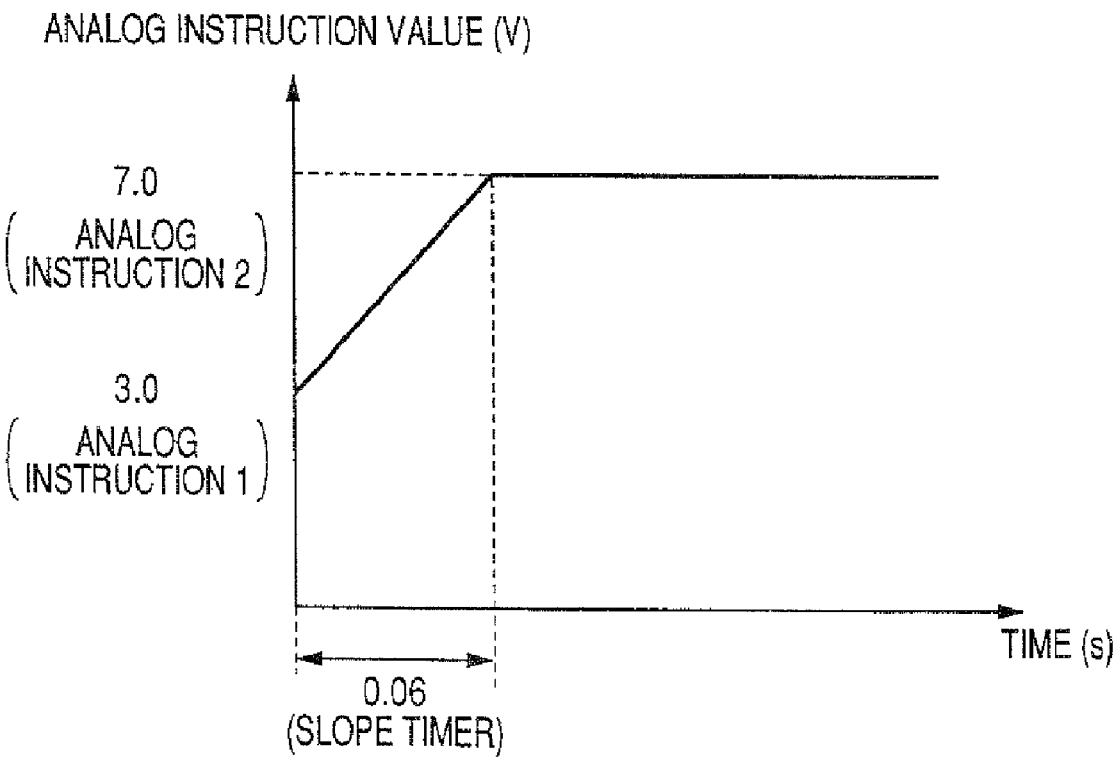

FIG. 8

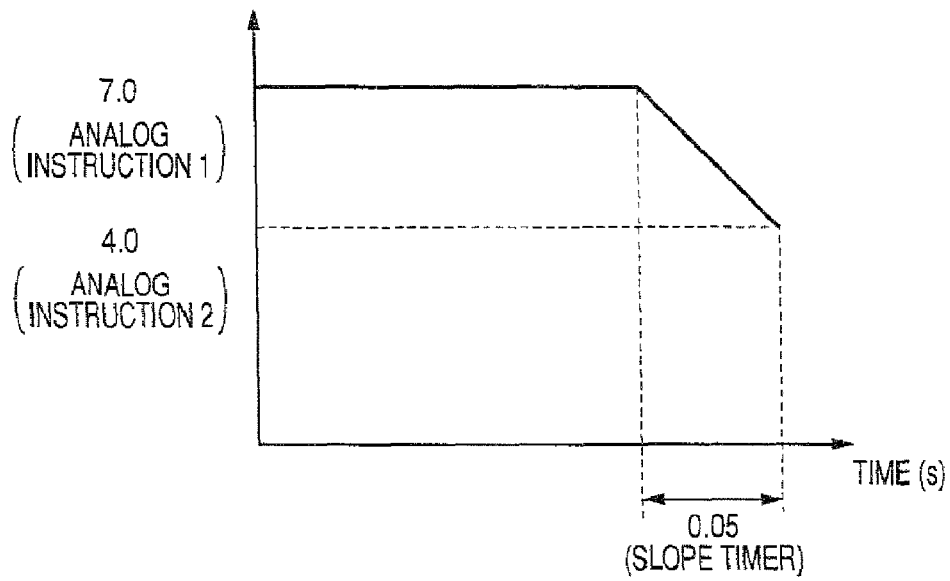

FIG. 9(a)

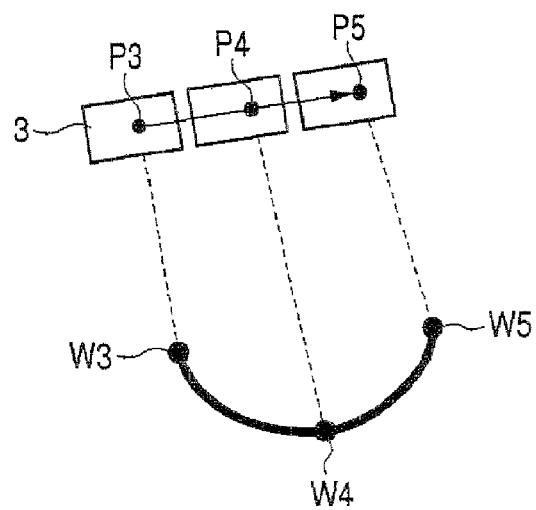

FIG. 9(b)

《 CIRCULAR ARC INTERPOLATION IS PERFORMED ALONG WELDING LINE FROM W3 TO W5 WHILE CONTROL POINT OF ROBOT IS MOVED P3, P4, AND P5 》

MOVL ··· P3 POSITION (ROBOT 6 AXIS) + W3 POSITION (LASER HEAD 2 AXIS)
CRLASON CSF#2 ··· WELDING START COMMAND
MOVL ··· P4 POSITION (ROBOT 6 AXIS) + W4 POSITION (LASER HEAD 2 AXIS)
MOVL ··· P5 POSITION (ROBOT 6 AXIS) + W5 POSITION (LASER HEAD 2 AXIS)
CRLASOF CEF#2 ··· WELDING END COMMAND

FIG. 10(a)
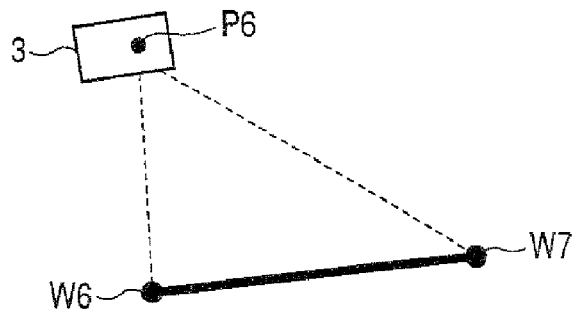
FIG. 10(b)
```
《 LINE INTERPOLATION IS PERFORMED ALONG WELDING LINE FROM W6 》
   TO W7 WHILE CONTROL POINT OF ROBOT STOPPED AT P6
        MOVL  ···  WELDING START POINT:
                   P6 POSITION (ROBOT 6 AXIS) + W6 POSITION (LASER HEAD 2 AXIS)
CRLASON CSF#1 ···  WELDING START COMMAND
        MOVL  ···  WELDING END POINT:
                   P6 POSITION (ROBOT 6 AXIS) + W7 POSITION (LASER HEAD 2 AXIS)
CRLASOF CEF#1 ···  WELDING END COMMAND
```
FIG. 11
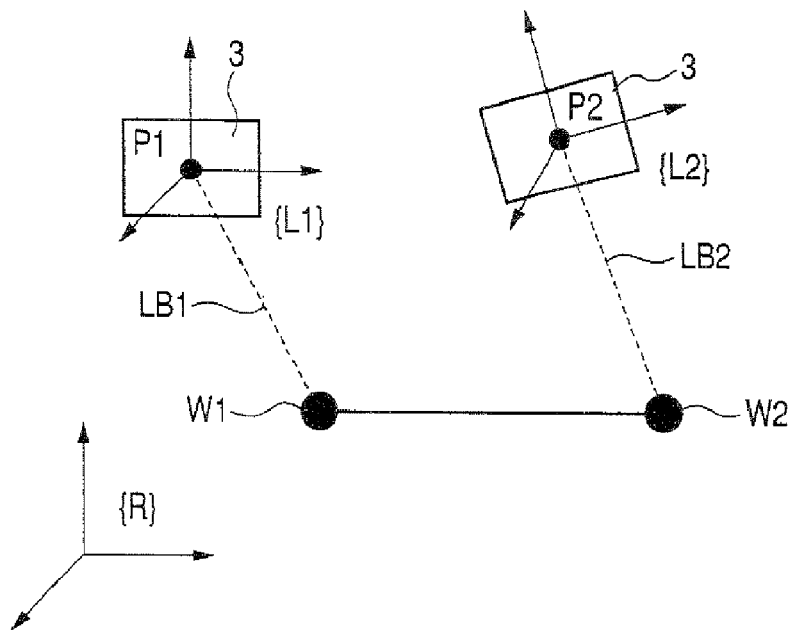

FIG. 14

| CONFIGURATION OF MACRO COEFFICIENT CRLAS | | |
|---|---|---|
| LASER-WELDING START CONDITION FILE | 1 | |
| LASER-WELDING END CONDITION FILE | 1 | |
| CIRCULAR ARC RADIUS | 100 | 0.1mm |
| CIRCULAR ARC ANGLE | 135 | deg |
| PREDICTED DISTANCE | 100 | 0.1mm |
| SURFACE ANGLE | 0 | deg |
| PREDICTED SPEED OF LOCUS | 2000 | 0.1mm/s |
| ROBOT POSITION (START) | REGISTRATION | |
| LASER HEAD FOCAL POSITION (START) | REGISTRATION | |
| ROBOT POSITION (END) | REGISTRATION | |
| LASER HEAD FOCAL POSITION (END) | REGISTRATION | |

FIG. 15

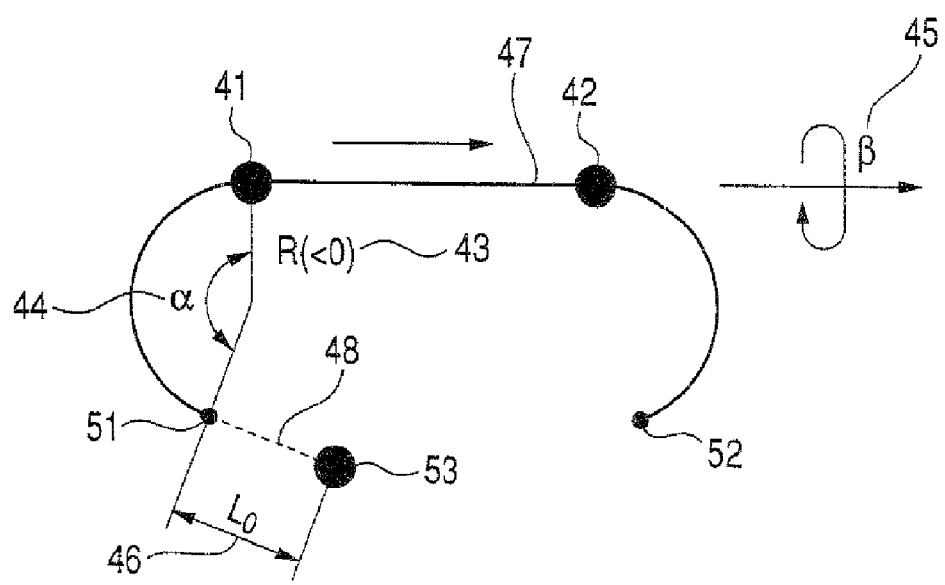

LASER TOOL ROBOT SYSTEM WITH COORDINATED DRIVE SHAFT CONTROL

TECHNICAL FIELD

The present invention relates to a robot system to which a tool having a driving shaft is fitted, and more particularly, to a robot system which performs a laser processing.

RELATED ART

As a known technology, there are laser processing apparatuses in which a mirror joint arm and a laser scanner are fitted on a front end of an arm of a robot (see Patent Document 1). Specifically, the laser scanner is moved by the robot arm and a laser beam is guided to a surface of a workpiece by the laser scanner. As three types of processing operations which are performed at that time, operations such as "STOP • AND • GO" which does not move the robot arm, "FLYING • MOTION" which moves both of the robot arm and the laser scanner, and "MOTIONLESS" which moves only the robot arm are described therein.

Meanwhile, a robot system is disclosed in FIGS. 20 and 21 (see Patent Document 2).

Patent Document 1: JP-A-2003-230975 (left line 7 to right line 12 of page 4)

Patent Document 2: JP-A-2004-174709 (line 5 of page 8 to line 2 of page 9)

FIG. 20 shows a 6 axis (F1 to F6) industrial robot arm in which a laser processing tool is fitted on the end portion of the robot arm. FIG. 21 is a diagram showing a continuous processing geometry which is overlapped with a manipulator geometry movement.

In FIG. 20, a tool 113 is a laser processing tool, and a workpiece 114 is processed by a laser beam 115. A known device 111 includes a control unit 112.3, and its control signal is transmitted to a tool 113 and/or a robot 112 through a transmission medium 112.8 such as a fieldbus. A processor means 112.7 and a determination means 112.6 of a memory unit 112.4 and a determination unit 112.5 are fitted to the control unit 112.3.

FIG. 21 schematically shows a cross-shaped movement path B of a front end of a tool (TCP) for performing a laser carving on a surface of a workpiece 114. In FIG. 21, a movement geometry B' of an end 112.2 of the robot 112 (shown in FIG. 20) or a robot arm 112.1 to which the tool 113 is fixed is overlapped with a processing geometry B. Specifically, the movement geometry B' of the robot is obviously different from that of a processing geometry B in a corner 116 of the processing geometry, that is, a region where a considerable change occurs in a route of the processing geometry B. During the process, the movement geometry B' of the robot stays in a space region B" ("MOBILITY TUBE" which is marked with a slant line in FIG. 21), which encloses the movement geometry B' in every side, and thus a deviation ΔB from the processing geometry B corresponds to a maximum moving amplitude of the 3-degree-of-freedom tool 113.

In the processing device, since the movement geometry B' of the manipulator 112 corresponds to the preset processing geometry B, the speed should be decreased in the region 116 where a sudden direction change of the processing geometry B occurs. Although the processing time of the workpiece 114 is greatly increased, a bad effect that a robot shaft is not active is compensated by allowing the movement geometry B' to progress or delay probably departing from the preset processing geometry B in the predetermined region 116 as the result of a real-time movement control in which the manipulator 112 and the tool 113 are mixed by the device. On the other hand, the processing geometry B in the region 116 is securely traced by a specific motion of the tool 113 which processes at much faster uniform speed.

Accordingly, on the whole the processing process is not influenced by the bad effect caused by the inactivity of the manipulator 112 by allowing the tool 113 to trace the processing geometry B while the manipulator 112 decreases the length of the geometry movement B' in a region where a processing profile is difficult.

DISCLOSURE OF THE INVENTION

Problems to be Solved by the Invention

However, in the device disclosed in Patent Document 1, there are not provided a detailed description and a figure with respect to a configuration of the robot arm and a control of the robot arm and the laser scanner. The device can not be achieved at all by specifying simple functions.

Additionally, in the device disclosed in Patent Document 2, an optimized calculation is necessary for the determination of the mobility tube B". In order that the robot arm has 6 degree of freedom, it is not certain what should be optimized (for example, whether the moving distance of the robot arm is minimized, a variation of a posture is minimized, a variation of a travel speed of the robot arm is minimized and the like), and it is never realized.

When it is calculated about the optimized solution that the moving distance of the robot arm is minimized, a motion of the robot arm that a manipulator expects can not be guaranteed. The reason is that an instruction with respect to a moving geometry of the robot arm should be generated so as to have an optimal value, though the processing geometry can be guaranteed. In such a system, there is a problem that interferences and the like between peripheral devices may occur.

The invention solves the above-mentioned problems. It is an object of the invention to provide a robot system which moves along an instructed geometry and controls the driving shaft of the tool so as to move a laser beam to a processing geometry desired by the manipulator.

Means for Solving the Problems

According to the invention of claim 1, there is provided a robot system including:

a robot including a plurality of driving shafts;

a tool which is fitted on a front end portion of the robot and includes a plurality of driving shafts;

a robot control device which controls the driving shafts of the robot and the driving shafts of the tool; and a laser oscillator connected to the tool, wherein the robot moves the tool with a drive of the driving shafts of the robot, the tool radiates a laser beam which is incident from the laser oscillator to an object with a drive of the driving shafts of the tool, and the robot control device controls the driving shafts of the robot and the driving shafts of the tool in synchronization with each other.

According to the invention of claim 2, there is provided the robot system according to claim 1, wherein the tool includes a lens which is disposed in a traveling path of the laser beam and which moves forwardly and backwardly in a traveling direction of the laser beam by the driving shafts of the tool, and the robot control device controls a focal position of the laser beam by driving the driving shafts of the tool to operate the lens.

According to the invention of claim 3, there is provided the robot system according to claim 1 or 2, wherein the tool includes a mirror which is disposed in the traveling path of the laser beam and which rotates by the driving shafts of the tool, and the robot control device controls the focal position of the laser beam by driving the driving shafts of the tool to rotate the mirror.

According to the invention of claim 4, there is provided the robot system according to claim 3, wherein a control point of the robot is the center of a driving shaft of the mirror, and the robot control device includes:

a robot shaft calculator which calculates a position of the control point of the robot, and a tool shaft calculator which calculates an operation instruction transmitted to the driving shafts of the tool from the position of the control point of the robot and a preset focal position of the laser beam.

According to the invention of claim 5, there is provided the robot system according to claim 4, wherein the robot control device includes:

a manipulator file storage for storing the position of the control point of the robot and the focal position of the laser beam.

According to the invention of claim 6, there is provided the robot system according to any one of claims 1 to 5, wherein the robot control device includes a start command for starting the radiation of the laser beam and an end command for ending the radiation, and the start command sets an interpolation method and a moving speed of the focal position of the laser beam in a radiation area.

According to the invention of claim 7, there is provided the robot system according to claim 6, wherein at least one of the start command and the end command changes an output instruction value transmitted to the laser oscillator from a first value to a second value at a predetermined time.

According to the invention of claim 8, there is provided the robot system according to claim 4, wherein the tool shaft calculator includes:

a position calculating section which calculates a radiation start position of the laser beam as viewed in a coordinate system fixed to a base of the robot on the basis of a position and posture of the control point of the robot as viewed in the coordinate system fixed to the base of the robot and the focal position of the laser beam as viewed in a coordinate system fixed to the tool at the time of instructing a radiation start point of the laser beam, and which calculates a radiation end position of the laser beam as viewed in the coordinate system fixed to the base of the robot on the basis of a position and posture of the control point of the robot as viewed in the coordinate system fixed to the base of the robot and the focal position of the laser beam as viewed in the coordinate system fixed to the tool at the time of instructing a radiation end point of the laser beam;

a calculating section of times of control cycle which calculates a vector of the radiation area and the times of control cycle on the basis of the radiation start position, the radiation end position, and the moving speed of the focal position of the laser beam in the radiation area of the laser beam;

a laser position instruction generating section which calculates the focal position of the laser beam every control cycle as viewed in the coordinate system fixed to the tool on the basis of the position and posture of the control point of the robot every control cycle as viewed in the coordinate system fixed to the base of the robot, which are calculated by the robot shaft calculator, the vector of the radiation area, and the times of control cycle, and on the basis of the radiation start position as viewed in the coordinate system fixed to the base of the robot, wherein the robot shaft calculator calculates the position and posture of the control point of the robot every control cycle as viewed in the coordinate system fixed to the base of the robot on the basis of the position and posture of the control point of the robot as viewed in the coordinate system fixed to the base of the robot at the time of instructing the radiation start point of the laser beam, and on the basis of the position and posture of the control point of the robot as viewed in the coordinate system fixed to the base of the robot at the time of instructing the radiation end point of the laser beam and the times of control cycle.

According to the invention of claim 9, there is provided the robot system according to claim 4 or 5, wherein the tool shaft calculator generates a locus of the focal position of the laser beam including a combination of two circular arcs and one line on the basis of two instructed focal position of the laser beam and a radius and an angle of a circular arc using the specified focal positions of the laser beam as end points.

According to the invention of claim 10, there is provided the robot system according to claim 9, wherein the tool shaft calculator generates the locus based on a slope of a plane including the specified locus.

According to the invention of claim 11, there is provided the robot system according to claim 9 or 10, wherein the tool shaft calculator generates the locus including the combination of two circular arcs and one line on the basis of a radius and an angle of a first circular arc using one of the two instructed focal positions of the laser beam as an end point and a radius and an angle of a second circular arc using the other instructed focal position of the laser beam as an end point.

According to the invention of claim 12, there is provided the robot system according to any one of claims 9 to 11, wherein the tool shaft calculator faces the direction in which the circular arc is specified.

According to the invention of claim 13, there is provided the robot system according to any one of claims 9 to 12, wherein the tool shaft calculator generates an auxiliary point apart from a start point of the locus by a specified distance in the front of the start point and adds an auxiliary locus, which connects the auxiliary point to the start point, to the locus.

According to the invention of claim 14, there is provided the robot system according to any one of claims 9 to 13, wherein the tool shaft calculator generates an auxiliary point apart from an end point of the locus by a specified distance in the back of the end point and adds an auxiliary locus, which connects the auxiliary point to the end point, to the locus.

According to the invention of claim 15, there is provided the robot system according to any one of claims 9 to 14, wherein the tool shaft calculator changes the shape of the generated locus by the specified radius and angle of the circular arc.

According to the invention of claim 16, there is provided the robot system according to claim 15, wherein the tool shaft calculator allows the generated locus to be a line when the radius of the specified circular arc is 0.

According to the invention of claim 17, there is provided the robot system according to claim 15, wherein the tool shaft calculator allows the generated locus to be a U-shape when the angle of the specified circular arc is 0°.

According to the invention of claim 18, there is provided the robot system according to claim 15, wherein the tool shaft calculator allows the generated locus to be a circle when the angle of the specified circular arc is 360° or more.

EFFECTS OF THE INVENTION

According to the invention, control a robot and a point of an end portion of a tool are moved on a manipulator's purpose, whereby an interference with a surrounding can be certainly avoided, thereby particularly obtaining an advantage that a system using a robot can be securely built.

BRIEF DESCRIPTION OF THE DRAWINGS

FIG. 1 is a configuration diagram illustrating a robot system according to an embodiment of the invention.
FIG. 2 is a configuration diagram illustrating a laser head as shown in FIG. 1.
FIG. 3 is a block diagram illustrating a robot control device as shown in FIG. 1.
[FIG. 4]
FIG. 4 is a diagram illustrating an example of an instructed position, a welding path, and an operation program with respect to a line interpolation in the robot system as shown in FIG. 1.
[FIG. 5]
FIG. 5 is a diagram illustrating an example of a laser-welding start condition file in the robot control device as shown in FIG. 3.
[FIG. 6]
FIG. 6 is a diagram illustrating an example of a laser-welding end condition file in the robot control device as shown in FIG. 3.
[FIG. 7]
FIG. 7 is a diagram illustrating an example of an instruction value transmitted to a laser welding device at the time of starting a laser welding due to the start condition file as shown in FIG. 5.
[FIG. 8]
FIG. 8 is a diagram illustrating an example of an instruction value transmitted to the laser welding device at the time of ending the laser welding due to the end condition file as shown in FIG. 6.
[FIG. 9]
FIG. 9 is a diagram illustrating an example of an instructed position, a welding path, and an operation program with respect to a circular arc interpolation in the robot system as shown in FIG. 1.
[FIG. 10]
FIG. 10 is a diagram illustrating an example of an instructed position, a welding path, and an operation program with respect to another line interpolation in the robot system as shown in FIG. 1.
[FIG. 11]
FIG. 11 is a diagram illustrating an example of a correlation between a welding instructed position and a laser head position.
FIG. 12 is a diagram fully illustrating a robot locus calculator and a laser locus calculator in the robot control device as shown in FIG. 3.
FIG. 13 is a diagram illustrating a laser-beam focal locus including a combination of a circular arc and a line generated by the laser locus calculator.
[FIG. 14]
FIG. 14 is a diagram illustrating an example of a screen of when a configuration with respect to the laser locus calculator is performed.
[FIG. 15]
FIG. 15 is a diagram illustrating a circular arc locus and a line locus generated by the laser locus calculator when a circular arc radius is negative.
FIG. 16 is a flowchart determining a shape of the laser-beam focal locus by means of a circular arc radius and a circular arc angle in the laser locus calculator.
FIG. 17 is a diagram showing one line locus generated by the laser locus calculator.
FIG. 18 is a diagram showing a locus of a U-shape generated by the laser locus calculator.
FIG. 19 is a diagram showing a locus of a circle generated by the laser locus calculator.
FIG. 20 is a configuration diagram illustrating the known device processing the workpiece.
FIG. 21 is a diagram shows a processing geometry of the device as shown in FIG. 20.

DESCRIPTION OF REFERENCE NUMERALS AND SIGNS

1: ROBOT
2: ROBOT CONTROL DEVICE
3: LASER HEAD
4: PENDANT
5: LASER WELDING DEVICE
6: FIBER
7: MIRROR
21: ROBOT SERVO AMPLIFIERS
22: LASER HEAD SERVO AMPLIFIERS
23: MANIPULATOR FILE STORAGE
24: COMMAND ANALYZER
25: ROBOT LOCUS CALCULATOR
26: LASER LOCUS CALCULATOR
31: POSITION CALCULATING SECTION
32: CALCULATING SECTION OF TIMES OF CONTROL CYCLE
33: LASER POSITION INSTRUCTION GENERATING SECTION
41: FIRST FOCAL POSITION
42: SECOND FOCAL POSITION
43: CIRCULAR ARC RADIUS
44: CIRCULAR ARC ANGLE
45: SURFACE ANGLE
46: FRONT DISTANCE

47: LASER-BEAM FOCAL LOCUS
48: AUXILIARY LOCUS
49: LASER-HEAD COORDINATE SYSTEM
50: LASER BEAM
51: WELDING START POINT
52: WELDING END POINT
53: AUXILIARY POINT

BEST MODE FOR CARRYING OUT THE INVENTION

Hereinafter, it is described about an embodiment of the invention with reference to the drawings.

Figure 1:
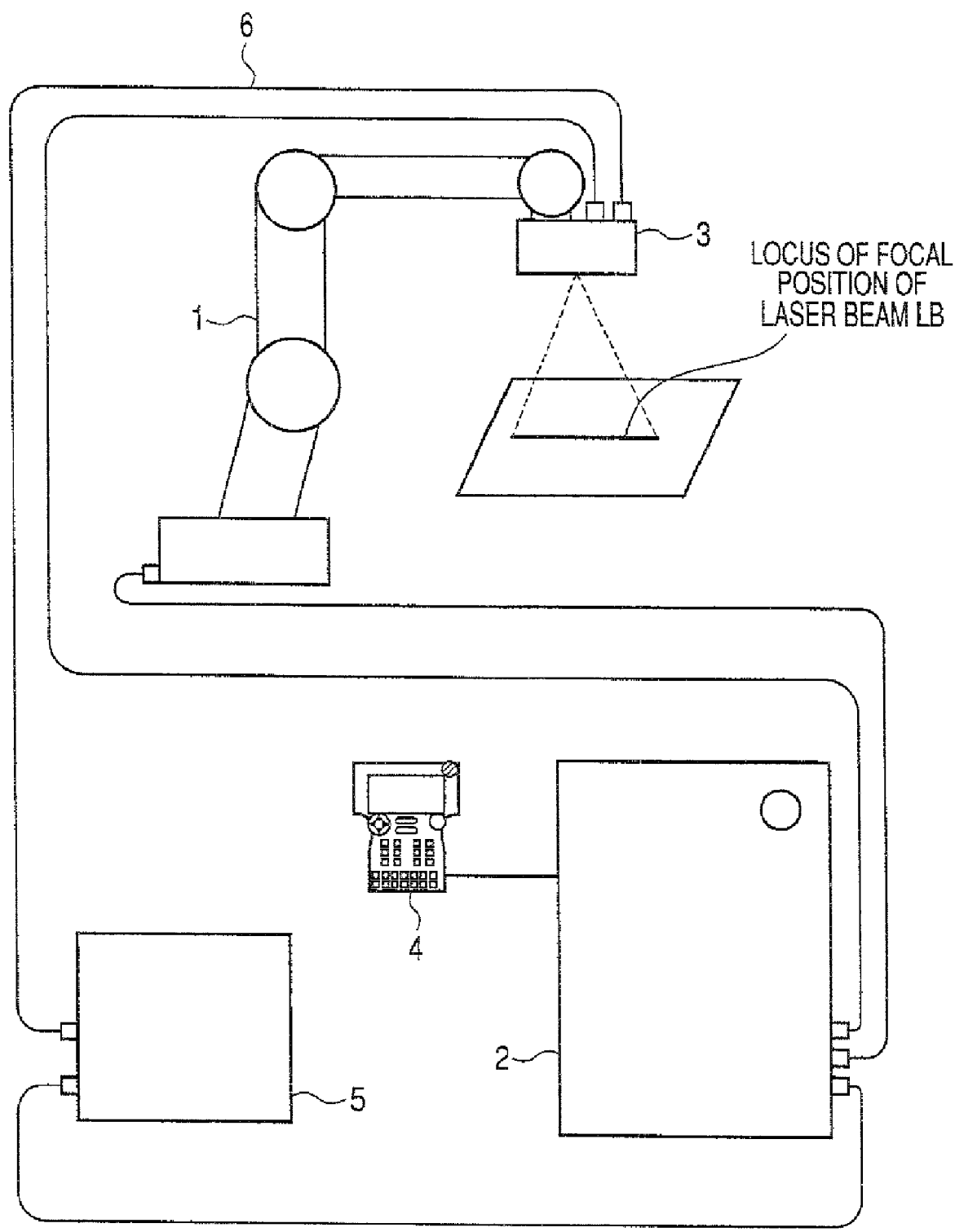
[FIG. 1]

FIG. 1 is a configuration diagram illustrating a robot system according to an embodiment of the invention.

In FIG. 1, a robot 1 has six joints. Each of them has a mechanism which is driven by servo motors, and a laser head 3 is fitted to a front end portion thereof.

A robot control device 2 is connected to the robot 1, a laser welding device 5, and the laser head 3, respectively. A manipulator has a pendant 4 so as to perform a instruction or a manipulation of the robot 1 and the laser head 3. The laser head 3 is connected to the laser welding device 5 through a fiber 6. A laser oscillator is built in the laser welding device 5. A laser beam outputted from the laser oscillator is incident on the laser head 3 through the fiber 6. The laser head 3 includes a mirror 7 (see FIG. 2), and the incident laser beam is reflected on the mirror 7, whereby its direction is changed to be radiated to an object, thereby performing a welding.

Figure 2:
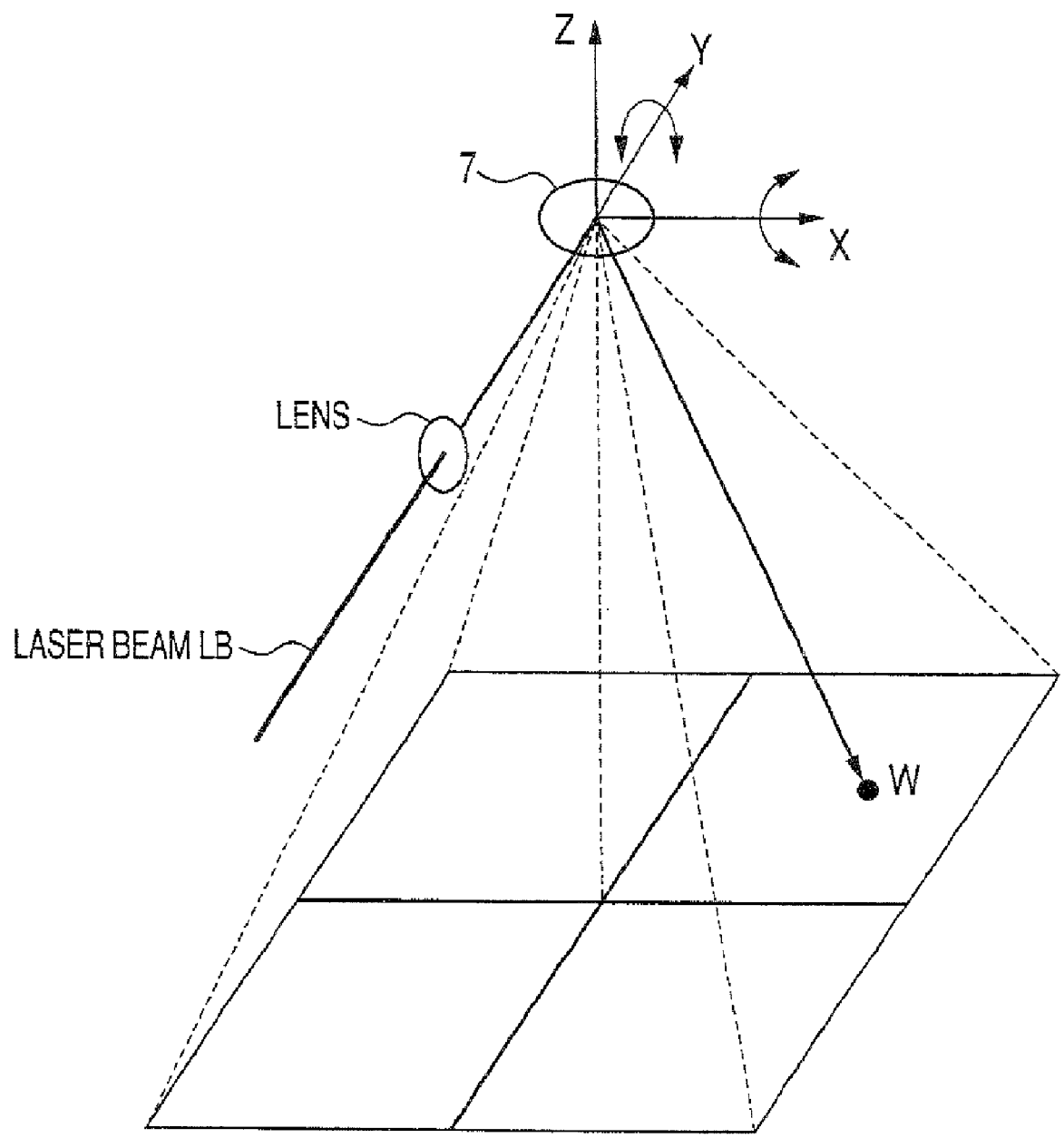
[FIG. 2]

FIG. 2 is a diagram briefly illustrating the laser head 3 as shown in FIG. 1.

In FIG. 2, the laser beam which is incident on the laser head 3 through the fiber 6 passes a lens in the laser head 3, and then it is concentrated. After the condensing, its direction is changed to the object by the mirror 7, and a focus is connected to a focal position W. The mirror 7 includes a rotation drive mechanism which is operated by servo motors (not shown) turning around axis X and servo motors (not shown) turning around axis Y in a coordinate system as shown in FIG. 2.

Figure 3:
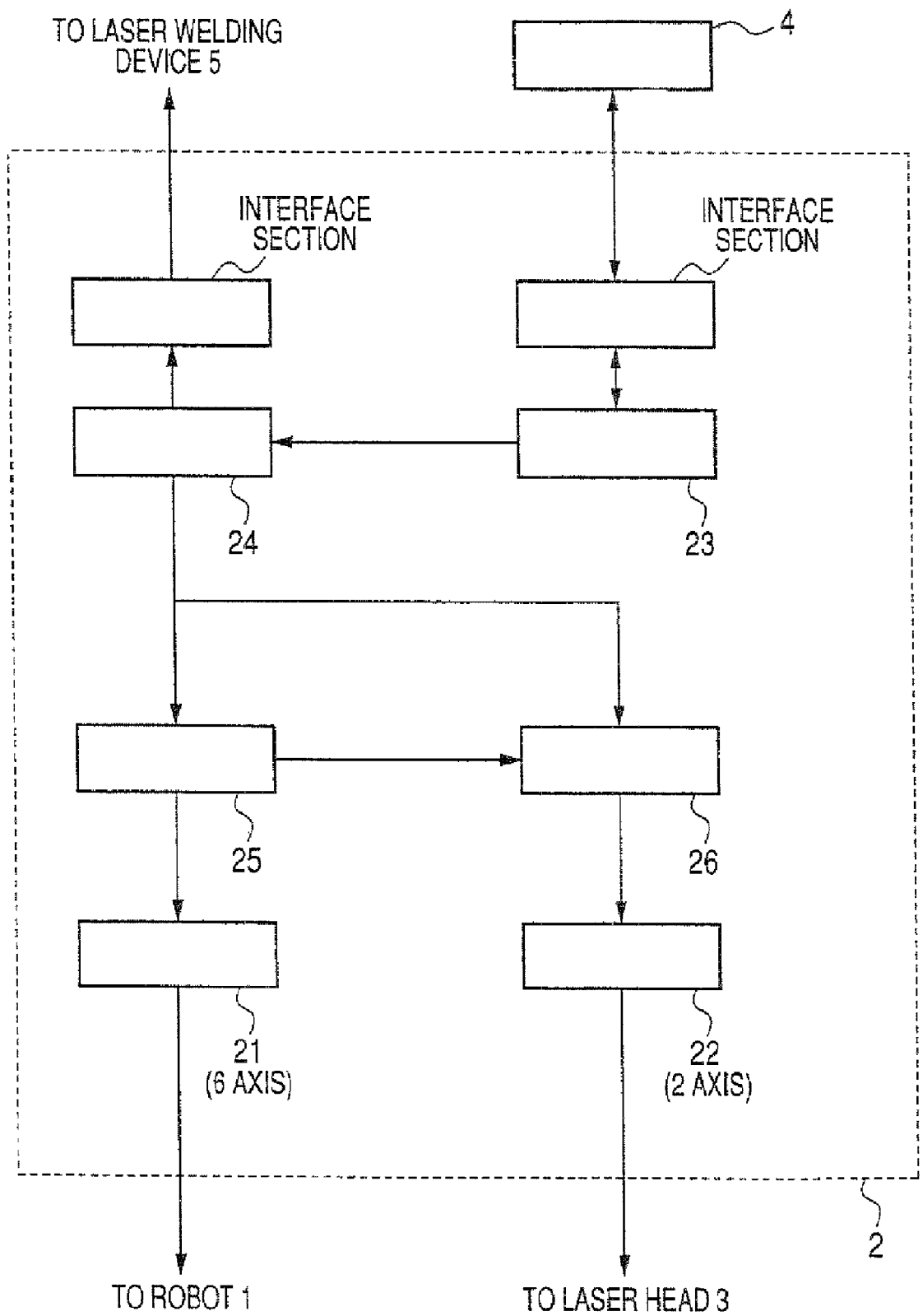
[FIG. 3]

FIG. 3 is a block diagram illustrating the robot control device 2 as shown in FIG. 1.

However, FIG. 3 only shows certain parts related to the invention from the configuration of the robot control device 2, and the other parts are omitted.

In FIG. 3, the robot control device 2 includes robot servo amplifiers 21 which control the servo motors of the above-mentioned robot 1 (shown in FIG. 1), laser head servo amplifiers 22 which control the servo motors of the laser head 3 (shown in FIG. 1), a manipulator file storage 23, a command analyzer 24, a robot locus calculator 25, and a laser locus calculator 26.

The manipulator file storage 23 stores operation programs of the robot 1 and the laser head 3 which are created by a manipulator and parameters related to the laser welding as a file format. The manipulator can write the operation programs and configure the parameters through the pendant 4.

The command analyzer 24 reads out the operation programs and the parameters for the laser welding which are stored in the manipulator file storage 23 so as to analyze the command. Depending on the analyzed command, a robot operation command and a laser head operation command are transmitted to the robot locus calculator 25, the laser locus calculator 26, and the laser welding device 5, respectively.

The robot locus calculator 25 transmits an instruction to the robot servo amplifiers 21 by calculating the locus on the basis of the command so as to operate the robot 1. Likewise, the laser locus calculator 26 transmits an instruction to the laser head servo amplifiers 22 by calculating the locus on the basis of the command so as to operate the mirror 7 (shown in FIG. 2).

Sequentially, an example of the laser welding according to the embodiment of the invention is described in detail with reference to the drawings.

FIG. 4(a) illustrates an example when the line interpolation welding is performed from a welding start point W1 to a welding end point W2 by driving the mirror 7 (shown in FIG. 2) while the laser head 3 (shown in FIG. 1) is moved from P1 to P2 by the robot 1 (shown in FIG. 1).

FIG. 4(b) is the operation program corresponding to the operation shown in FIG. 4(a).

In the operation program shown in FIG. 4(b), "MOVL" in the first line is a command that a control point of the robot 1 is moved to P1 in a straight line and the mirror 7 in the laser head 3 is operated.

The control point is previously configured to be the rotation center of the mirror 7. Thus, W1 becomes a laser-beam focal position.

"CRLASON CSF#1" in the next line is a welding start command. The laser welding is started by controlling the laser head 3 and the laser welding device 5 (shown in FIG. 1) in accordance with a configuration of a laser-welding start condition file marked with CSF#1. The laser-welding start condition file will be fully described as below (see FIG. 5).

"MOVL" in the third line is a command that the mirror 7 in the laser head 3 is operated while the control point of the robot 1 is moved to P2 in a straight line. Thus, the line connecting W1 to W2 denotes a locus of a laser-beam focal position.

"CRLASOF CEF#1" in the fourth line is a welding end command. The laser welding is finished by controlling the laser head 3 and the laser welding device 5 in accordance with a configuration of a laser-welding end condition file marked with CEF#1. The laser-welding end condition file will be described later (see FIG. 6).

In order to perform the laser welding as shown in FIG. 4 by the robot system according to the embodiment, the manipulator should move the robot 1 and the laser head 3 to the desired position in advance through the pendant 4 (shown in FIG. 1), instruct the positions of the driving shafts of the robot 1 and the mirror 7 in the laser head 3 so as to prepare the operation program like that shown in FIG. 4(b), and record them in the manipulator file storage 23.

Whenever the welding process is performed, the manipulator should select the operation program through the pendant 4 and instruct the operation start. The command analyzer 24 executes the command described in the operation program by reading out them line by line, and controls the laser welding device 5 by transmitting a position instruction to the robot locus calculator 25 and the laser locus calculator 26 on the basis of the condition which is specified by the laser-welding start condition file and the laser-welding end condition file.

In case of FIG. 4, the robot locus calculator 25 calculates an interpolation with respect to the locus of when the mirror 7 in the laser head 3 is moved from P1 to P2. The calculation is performed by means of the known technology, and the position instruction value is calculated at every predetermined control cycle.

The laser locus calculator 26 calculates the rotation angle of the mirror 7 from the welding speed which is instructed in accordance with the control point position of the robot 1 at every control cycle, the welding line position, and the laser-welding condition start file. The robot locus calculator 25 and the laser locus calculator 26 transmit the position instruction obtained by the calculation to the servo amplifiers 21 and 22.

When the laser welding is finished, the laser output is turned off in accordance with the configuration of the laser-welding end condition file.

As described above, the robot control device 2 controls the movement speed of the robot so as to allow the laser-beam focal position to be the welding start point W1 in the control point P1 of the robot, and the laser-beam focal position to be the welding end point W2 in the control point P2 of the robot.

Hereinafter, it will be fully described about the laser-welding condition file as shown in FIGS. 5 and 6.

FIG. 5 is a diagram showing an example of the laser-welding start condition file in the robot control device as shown in FIG. 3. FIG. 6 is a diagram showing an example of the laser-welding end condition file in the robot control device as shown in FIG. 3. The manipulator can display these laser-welding condition files on the display by manipulating the pendant 4. Additionally, the manipulator can change freely the configuration of the laser-welding condition file by manipulating the pendant 4 so as to record the configuration in the manipulator file storage 23. The laser-welding condition file exists plurally, and can be identified by the unique number of every file. The manipulator can perform various configurations with respect to each of the laser-welding condition files. In an example as shown in FIG. 4, the first laser-welding condition file is marked with CSF#1, and the first laser-welding end condition file is marked with CEF#1.

As mentioned above, the CRLASON command (shown in FIG. 4(b)) denotes the welding start command, the laser-welding start condition file as shown in FIG. 5 is specified by an operand. Meanwhile, the CRLASOF command (shown in FIG. 4(b)) denotes the welding end command. Likewise, the laser-welding end condition file as shown in FIG. 6 is specified by the operand.

The laser locus calculator 26 (shown in FIG. 3) calculates the welding point in the section between the CRLASON command and the CRLASOF command in accordance with the interpolation method specified in "interpolation type" item of the laser-welding start condition file as shown in FIG. 5. The above-mentioned FIG. 4 is an example of when the line interpolation is specified in "interpolation type" item.

In addition, when the CRLASON command is executed, the welding condition number (12 in case of FIG. 5) described in the specified laser-welding start condition file is transmitted to the laser welding device 5. In the laser welding device 5 (shown in FIG. 1), the welding condition (output watt and the like) corresponding to the welding condition number is registered in advance, and the laser welding device 5 outputs the laser beam in accordance with the welding condition.

At the same time, voltage value specified as "analog instruction value 1" of the laser-welding start condition file is outputted to the laser welding device 5. The output voltage increases, in time which is specified by "a slope timer", from the value specified as "analog instruction value 1" to the value specified as "analog instruction value 2". The figure is shown in FIG. 7.

FIG. 7 is a diagram showing an example of the instruction value transmitted to the laser welding device at the time of starting the laser welding due to the laser-welding start condition file as shown in FIG. 5. There is an example that voltage of 3.0 V specified as the initial "analog instruction value 1" is outputted to the laser welding device 5, and voltage of 3.0 V specified as the analog instruction value 1 increases up to voltage of 7.0 V specified as "analog instruction value 2" for 0.06 seconds specified by "slope timer".

Conversely, when the CRLASOF command is executed, the voltage outputted to the laser welding device 5 decreases from the value specified as "analog instruction value 1" to the value specified as "analog instruction value 2" for the time specified as "slope timer" of the laser-welding end condition file. The figure is shown in FIG. 8.

FIG. 8 is a diagram showing an example of the instruction value transmitted to the laser welding device at the time of ending the laser welding due to the laser-welding end condition file as shown in FIG. 6. There is an example that the voltage of 7.0 V specified as the initial "analog instruction value 1" outputted to the laser welding device 5 decreases down to the voltage of 4.0 V specified as "analog instruction value 2" for the time of 0.05 seconds specified as "slope timer".

Although FIG. 4 is an example of the line interpolation, the interpolation method based on the welding line can be specified by "interpolation type" item of the laser-welding start condition file. FIG. 9 is an example that a circular arc interpolation is selected in "interpolation type". FIG. 9(a) shows the figure that a circular arc interpolation welding is performed from the welding start point W3 to the welding end point W5 via W4 while the laser head 3 is moved in a straight line to P3, P4, and P5 by the robot 1. FIG. 9(b) shows the operation program corresponding to the operation.

In the operation program shown in FIG. 9(b), "MOVL" in the first line is a command that the mirror 7 in the laser head 3 is operated while the control point of the robot 1 is moved in a straight line to P3. The control point is previously configured to be the rotation center of the mirror 7. Thus, W3 becomes the laser-beam focal position.

"CRLASON CSF#2" in the next line is the welding start command. The laser welding is started by controlling the laser head 3 and the laser welding device 5 (shown in FIG. 1) in accordance with a configuration of the laser-welding start condition file marked with CSF#2.

When the circular arc interpolation is specified, "MOVL" in the third line is the command that the mirror 7 in the laser head 3 is operated so as to allow the welding locus (the locus of the laser-beam focal position) to be the circular arc interpolation while the control point of the robot 1 is moved in a straight line to P4.

Likewise, "MOVL" in the fourth line is the command that the mirror 7 in the laser head 3 is operated so as to allow the welding locus (locus of the laser-beam focal position) to be the circular arc interpolation while the control point of the robot 1 is moved in a straight line to P5. Thus, the circular arc connecting W3, W4, and W5 becomes the locus of the laser-beam focal position.

"CRLASOF CEF#2" in the fifth line is the welding end command. The laser welding is finished by controlling the laser head 3 and the laser welding device 5 in accordance with a configuration of a laser-welding end condition file marked with CEF#2.

Additionally, it is possible to perform the laser welding by operating the mirror 7 with the laser head 3 fixed. FIG. 10(a) shows the figure of when the line interpolation welding is performed from the welding start point W6 to the welding end point W7 by rotating the mirror 7 in the state that the rotation center of the mirror 7 in the laser head 3 is stopped at P6. FIG. 10(b) shows the operation program corresponding to the operation.

In the operation program in FIG. 10(b), "MOVL" in the first line is a command that the mirror 7 in the laser head 3 is operated while the control point of the robot 1 is moved in a straight line to P6. The control point is previously configured to be the rotation center of the mirror 7. Thus, point W6 becomes the laser-beam focal position.

"CRLASON CSF#1" in the next line is the welding start command. The laser welding is started by controlling the laser head 3 and the laser welding device 5 (shown in FIG. 1) in accordance with the configuration of the laser-welding start condition file (shown in FIG. 5) marked with CSF#1.

"MOVL" in the third line is a command that the mirror 7 in the laser head 3 is operated while the control point of the robot 1 is moved to P6 (i.e. there is no movement). Thus, the line connecting the points W6 to W7 becomes the locus of the laser-beam focal position.

"CRLASOF CEF#1" in the fourth line is the welding end command. The laser welding is finished by controlling the laser head 3 and the laser welding device 5 in accordance with the configuration of the laser-welding end condition file (shown in FIG. 6) marked with CEF#1.

The interpolation control with respect to the focal position W is not performed outside the welding area. That is, it is controlled so as to regularly output angle data from the present instructed position to the next instructed position of the servo motors in the laser head 3.

Subsequently, it is fully described about the robot locus calculator 25 and the laser locus calculator 26 with reference to the drawings.

FIG. 11 is a diagram showing an example of a correlation between a welding instructed position and the position of the laser head 3. When the welding start point W1 is instructed, the robot 1 (shown in FIG. 1) is manipulated so as to move the laser head 3 to P1 and the mirror 7 (shown in FIG. 1) in the laser head 3 is manipulated so as to allow the laser beam LB1 to face the welding start point W1. Likewise, when the welding end point W2 is instructed, the robot 1 is manipulated so as to move the laser head 3 to P2 and the mirror 7 in the laser head 3 is manipulated so as to allow the laser beam LB2 to face the welding end point W2. In the laser head 3, the coordinate system that the control point (P1 and P2 in case of FIG. 11) of the robot 1 is the starting point is configured, and it is configured that the coordinate system at the time of starting the welding is marked with {L1} and the coordinate system at the time of ending the welding is marked with {L2}.

In FIG. 11, a robot coordinate system is marked with {R} and a base portion of the robot 1 is configured to be the starting point. Hereinafter, it is described about the robot locus calculator 25 and the laser locus calculator 26 in the case that the welding start point W1 and the welding end point W2 as shown in FIG. 11 are instructed.

Figure 12:
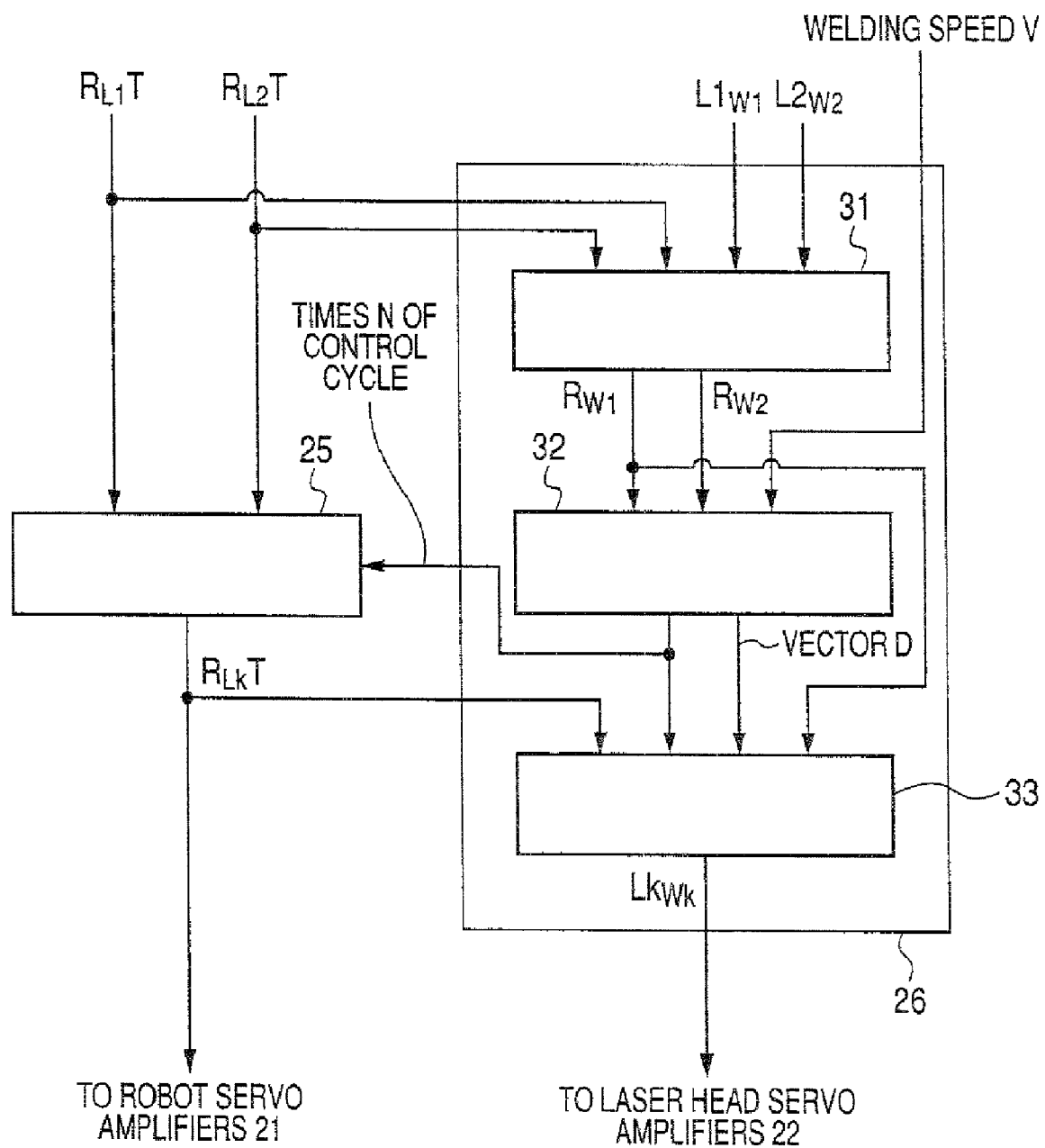
[FIG. 12]

FIG. 12 is a diagram fully illustrating the robot locus calculator 25 and the laser locus calculator 26 of the robot control device 2 as shown in FIG. 3. As shown in the drawings, the laser locus calculator 26 includes a position calculating section 31, a calculating section of times of control cycle 32, and a laser position instruction generating section 33.

The position calculating section 31 outputs the position RW1 of the welding start point W1 as viewed in the robot coordinate system {R} by using the following expression on the basis of a position and posture RL1T of the laser-head coordinate system {L1} at the time of starting the welding as viewed in the robot coordinate system {R} and a position L1W1 of the welding start point W1 as viewed in the laser-head coordinate system {L1} at the time of starting the welding.

$$RW1 = RL1T \cdot L1W1 \quad (1)$$

Additionally, the position calculating section 31 outputs the position RW2 with respect to the welding end point W2 as viewed in the robot coordinate system {R} by using the following expression on the basis of a position and posture RL2T of the laser-head coordinate system {L2} at the time of ending the welding as viewed in the robot coordinate system {R} and a position L2W2 of the welding end point W2 as viewed in the laser-head coordinate system {L2} at the time of ending the welding.

$$RW2 = RL2T \cdot L2W2 \quad (2)$$

The calculating section of times of control cycle 32 calculates the vector D from the welding start point W1 to the welding end point W2 on the basis of the position RW1 of the welding start point W1 as viewed in the robot coordinate system {R} and the position RW2 of the welding end point W2 as viewed in the robot coordinate system {R} which are calculated through the expressions (1) and (2).

Additionally, the welding speed V instructed by the laser-welding start condition file as shown in FIG. 5 is acquired from the command analyzer 24, and then the times N of the control cycle Δt from the welding start point W1 to the welding end point W2 is calculated by using the following expression. Herein, it is configured that Δt is an actual number larger than 0 and N is a positive number larger than 0 or more.

$$N = |D|/(V \cdot \Delta t) \quad (3)$$

The laser position instruction generating section 33 calculates the position RWk of the welding point Wk as viewed in the robot coordinate system {R} by inputting the position RWk of the welding start point W1 as viewed in the robot coordinate system {R}, the vector D from the welding start point W1 to the welding end point W2, the times of control cycle N calculated by the expression (3), and the control cycle at k-th (k is a positive number, but, 0≦k≦N) time to the following expression.

$$RWk = RW1 + D \cdot (k/N) \quad (4)$$

Additionally, the laser position instruction generating section 33 outputs the position LkWk of the welding point Wk as viewed in the laser-head coordinate system {Lk} in the control cycle at kth time by using the following expression on the basis of a position and posture RLkT (described later) of the laser-head coordinate system {Lk} as viewed in the robot coordinate system {R} in the control cycle at kth time calculated by the robot locus calculator 25 and the position RWk of the welding point Wk as viewed in the robot coordinate system {R} in the control cycle at kth time calculated by using the expression (4).

$$LkWk = LkRT \cdot RWk \quad (5)$$

Meanwhile, the robot locus calculator 25 outputs a position and posture RLkT of the laser-head coordinate system {Lk} as viewed in the robot coordinate system {R} in the control cycle at kth time by using the following expression on the basis of a position and posture RL1T of the laser-head coordinate system {L1} at the time of starting the welding as viewed in the robot coordinate system {R}, a position and posture RL2T of the laser-head coordinate system {L2} at the time of ending the welding as viewed in the robot coordinate system {R}, and the times of control cycle N acquired by using the expression (3) in the calculating section of times of control cycle 32.

$$RLkT = RL1T + (RL2T - RL1T) \cdot (k/N) \quad (6)$$

The output RLkT of the robot locus calculator 25 and the output LkWk of the laser position instruction generating section 33 are inputted to the robot servo amplifiers 21 and the laser head servo amplifiers 22, respectively. The robot servo amplifiers 21 and the laser head servo amplifiers 22 operate the servo motors of the robot 1 and the servo motors of the laser head 3, respectively.

As described above, in the robot locus calculator 25, the position and a posture RLkt of the laser-head coordinate system {Lk} as viewed in the robot coordinate system {R} in the control cycle at kth time is acquired by using the times of control cycle N acquired by the calculating section of times of control cycle N in the laser locus calculator 26. That is, the servo motors in the robot 1 and the servo motors in the laser head 3 use the same times of control cycle N, whereby the servo motors in the robot 1 and the servo motors in the laser head 3 are started and stopped at the same time, thereby having the same moving time in the welding area between the servo motors in the robot 1 and the servo motors in the laser head 3. Namely, the locus from the welding start point W1 to the welding end point W2 at the time of a playback is performed as the instruction. Additionally, the positions of the laser head 3 at the welding start point W1 and the welding end point W2 are performed as the instruction.

Subsequently, it is described about another function of the laser locus calculator 26 with reference to the drawings.

Figure 13:
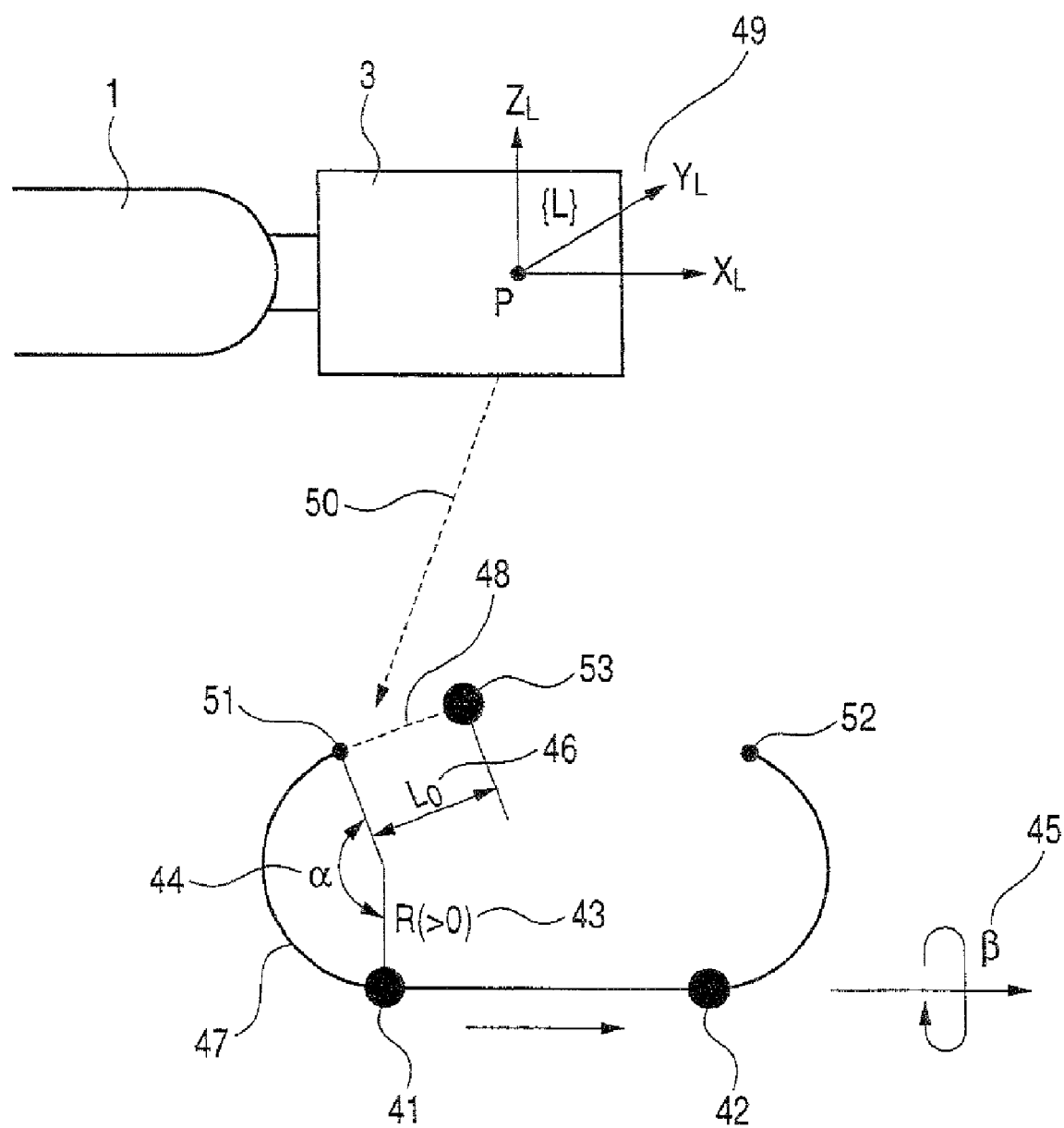
[FIG. 13]

FIG. 13 is a diagram showing the locus of the laser-beam focal position by means of a combination of a circular arc and a line generated by the laser locus calculator 26. In FIG. 13, the first focal position 41 and the second focal position 42 are points which are actually instructed by the manipulator manipulating the robot 1 and the laser head 3 so as to move laser beam 50. It is configured that the welding is performed in the direction from the first focal position 41 to the second focal position 42.

A circular arc radius 43 and a circular arc angle 44 are connected to the line connecting the first focal position 41 and the second focal position 42, and thus a circular arc radius (R shown in FIG. 13) and an angle (α shown in FIG. 13) make one locus.

The laser-beam focal locus 47 is a locus which connects a first circular arc using the first focal position 41 as an end point, a second circular arc using a second focal position 42 as an endpoint, the focal position 41, and the focal position 42, that is, a section which connects the other end point (the welding start point 51) of the first circular arc as shown in FIG. 13, the first focal position 41, the second focal position 42, and the other end point (the welding end point 52) of the second circular arc.

A surface angle 45 is angle that determines a plane having the laser-beam focal locus 47, is defined as an angle around the line connecting the first focal position 41 and the second focal position 42 (β shown in FIG. 13), and exists on a plane having the laser-beam focal locus 47. When a vector which is perpendicular to a vector facing from the first focal position 41 to the second focal position 42 is perpendicular to axis ZL of the laser-head coordinate system 49, it is configured that the surface angle 45 is 0°.

A front distance 46 is defined as a distance (L0 shown in FIG. 13) between the welding start point 51 and the auxiliary point 53 extending from the welding start point 51 to the outside of a tangent line of the circular arc. An auxiliary locus 48 is defined as the range from the auxiliary point 53 to the welding start point 51. Since the auxiliary locus 48 is not the welding area but a section provided for the laser-beam focal locus so as to pass the welding start point 51 as described below, the laser beam 50 is not radiated in this section.

Hereinafter, it is described about a role of an auxiliary point 53.

In many cases, the robot 1 and the mirror 7 of the laser head 3 move at high speed relative to the section of the laser-beam focal locus 47 in order to decrease a tact time in a section other than the laser-beam focal locus 47. For this, depending on the direction approaching the welding start point 51, there is a case that the focal locus does not pass the welding start point 51 due to causes such as a tracing delay of the servo system.

In order to prevent the situation, the auxiliary point 53 is provided, and the laser-beam focal locus is allowed to pass the auxiliary point 53 and the welding start point 51 even when the laser-beam focal position moves at high speed in the section other than the laser-beam focal locus 47.

As described above with reference to FIG. 13, the laser locus calculator 26 (shown in FIG. 12) generates the laser-beam focal locus 47. However, the information which is necessary for generating the laser-beam focal locus 47 can be inputted in the configuration screen shown in FIG. 14. FIG. 14 is a diagram showing an example that a configuration with respect to the laser locus calculator 26 is performed. The configuration item shown here is displayed on the screen by the manipulator manipulating the pendant 4. The manipulator can record the result of a configuration or a change in the manipulator file storage 23.

In FIG. 14, "laser-welding start condition file" and "laser-welding end condition file" are already described with reference to FIGS. 5 and 6. Herein, the laser-welding condition file is marked with a number in the same way as described above. In an example as shown in FIG. 14, all of them are specified as the first file.

"Circular arc radius", "circular arc angle", "predicted distance", and "surface angle" correspond to the circular arc radius R, the circular arc angle α, the front distance L0, and the surface angle β as shown in FIG. 13, respectively. In "predicted locus speed", the moving speed of the laser-beam focal position is specified in the section of the auxiliary locus 48. However, as described above, the laser beam 50 is not radiated in the section of the auxiliary locus 48.

The first focal position 41 as shown in FIG. 13 is registered in "robot position (start)" and "laser head focal position (start)". The second focal position 42 as shown in FIG. 13 is registered in "robot position (end)" and "laser head focal position (end)".

As described above with reference to FIGS. 13 and 14, the laser locus calculator 26 can generate the laser-beam focal locus including the combination of the circular arc and the line on the basis of two instruction points and the parameters with respect to several shapes. Therefore, it is remarkably simple to generate the locus relative to a method which needs plural instruction points. Additionally, it is possible to generate plural laser-beam focal locuses having different shapes and sizes by changing the parameter relative to a shape.

In the example as shown in FIG. 13, even when the moving speed of the laser-beam focal position is large in the section other than the laser-beam focal locus 47, the auxiliary point 53 is provided so as to allow the laser-beam focal locus to pass the welding start point 51. However, when it is possible to pass the welding start point 51 irrespective of whether the moving speed in the section other than the laser-beam focal locus 47 is low or high, the auxiliary point 53 is not provided and the generated locus may be defined as the range of the welding start point 51 to the welding end point 52.

Even about the welding end point 52, there is a case that the laser beam focal locus does not pass the welding end point 52 depending on the moving speed or a deviation direction of the laser beam focal position after passing the welding end point 52. In that case, an auxiliary point can be provided to the side of the welding end point 52.

In the example as shown in FIG. 13, the surface angle 45 (β shown in FIG. 13) determining the slope of the plane having the laser-beam focal locus 47 is provided. However, when the vector which is perpendicular to the vector facing from the first focal position 41 to the second focal position 42 and which exists on the plane having the laser beam locus 47 is always perpendicular to the axis ZL of the laser-head coordinate system 49, the configuration of the surface angle β may be omitted.

Additionally, in the examples as shown in FIGS. 13 and 14, the circular arc in the side of the first focal position 41 and the circular arc in the side of the second focal position 42 are the same circular arc having the same size and shape using the same circular arc radius R and the same circular arc angle α, but it is possible to make circular arcs having different sizes and shapes on both sides of the first focal position 41 and the second focal position 42 by using different circular arcs and angles.

FIG. 15 is a diagram showing an example of the laser-beam focal locus including the combination of the circular arc and the line generated by the laser locus calculator 26 (shown in FIG. 12) when a negative value is inputted in "circular arc" item of the configuration screen as shown in FIG. 14. The circular arcs shown in FIG. 15 have a reverse direction relative to those shown in FIG. 13.

Usually, the circular arc radius can not have a negative value, but in the embodiment the direction of the circular arc is determined by means of the positive and negative of the circular arc radius 43. It is possible to intuitively configure the direction of the circular arc without adding another configuration item to the configuration screen shown in FIG. 14.

Figure 16:
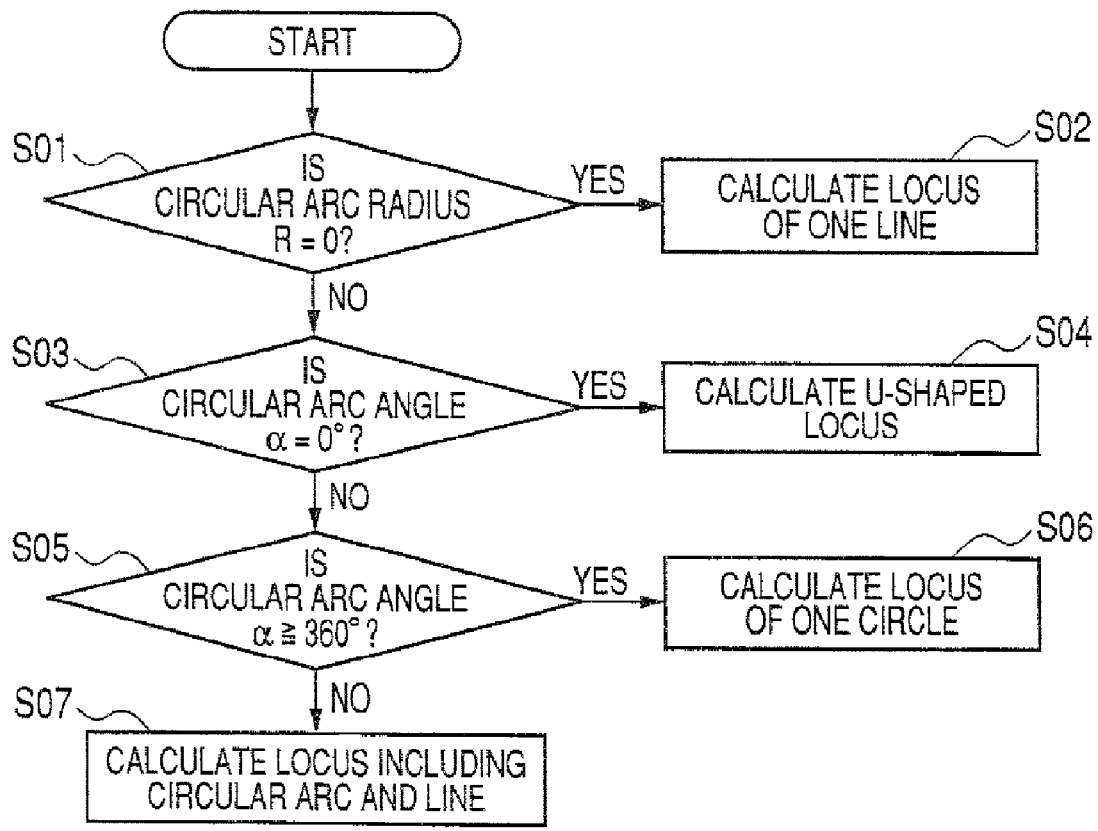
[FIG. 16]

FIG. 16 is a flowchart illustrating the case that a shape of the laser-beam focal locus 47 is determined by the specified circular arc radius R and the specified circular arc angle α in the configuration screen as shown in FIG. 14 in the laser locus calculator 26 (shown in FIG. 12).

In step S01 shown in FIG. 16, whether the circular arc radius R is 0 or not is determined. When the circular arc radius R is 0, one line locus calculation (described below, see FIG. 17) is performed in step S02, and when it is not, the present step is moved to step S03 so as to determine whether the circular arc angle α is 0 or not.

When the circular arc angle α is 0, the present step is moved to a U-shaped locus calculation (described below, see FIG. 18) in S04, and when it is not, the present step is moved to step S05 so as to determine whether the circular arc α is 360° or more.

When the circular arc angle α is 360° or more, the present step is moved to step S06 so as to perform one circle locus calculation (described below, see FIG. 19). When it is not, the present step is moved to step S07 so as to perform the locus calculation (described above, see FIGS. 13 to 15) including the combination of the circular arc and the line.

Hereinafter, it is described about the step of S02, S04, and S06.

Figure 17:
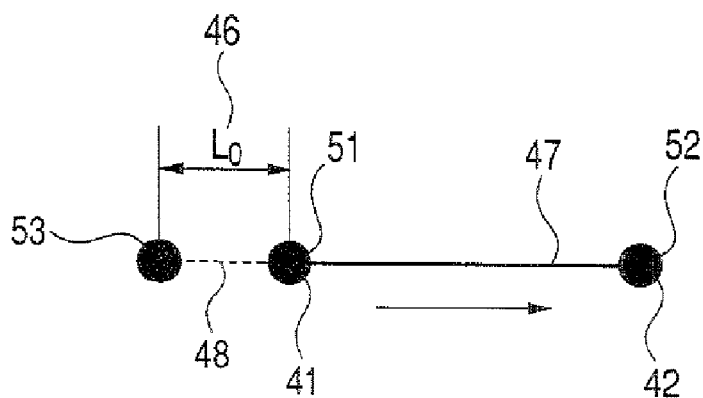
[FIG. 17]

FIG. 17 is a diagram showing one line locus (step S02) generated by the laser locus calculator 26 (shown in FIG. 12). When the circular arc radius R is 0 in FIG. 13, it is not possible to make a circular arc using the first focal position 41 or the second focal position 42 as the end point. Intuitively, it is an image that the center of the circular arc is absorbed by the first focal position 41 and the second focal position 42. Accordingly, when the circular arc R is 0, one line locus as shown in FIG. 17 is made. In this case, the preset circular arc angle α or the preset surface angle β is disregarded. Additionally, the welding start point 51 and the welding end point 52 become the same points as the first focal position 41 and the second focal position 42.

Figure 18A:
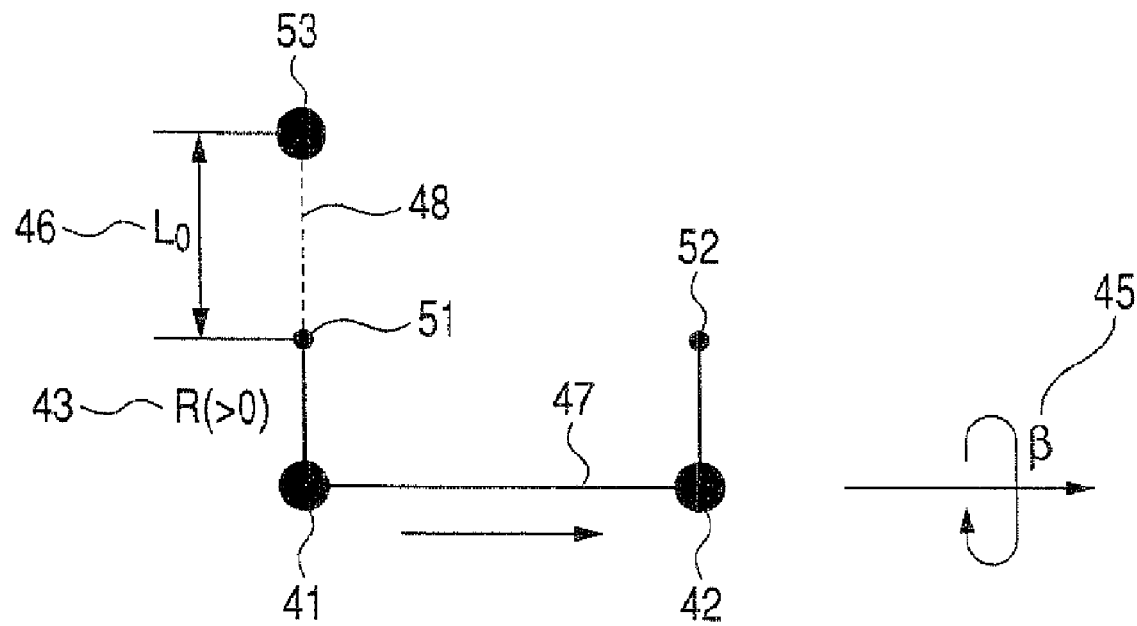
[FIG. 18]
Figure 18B:
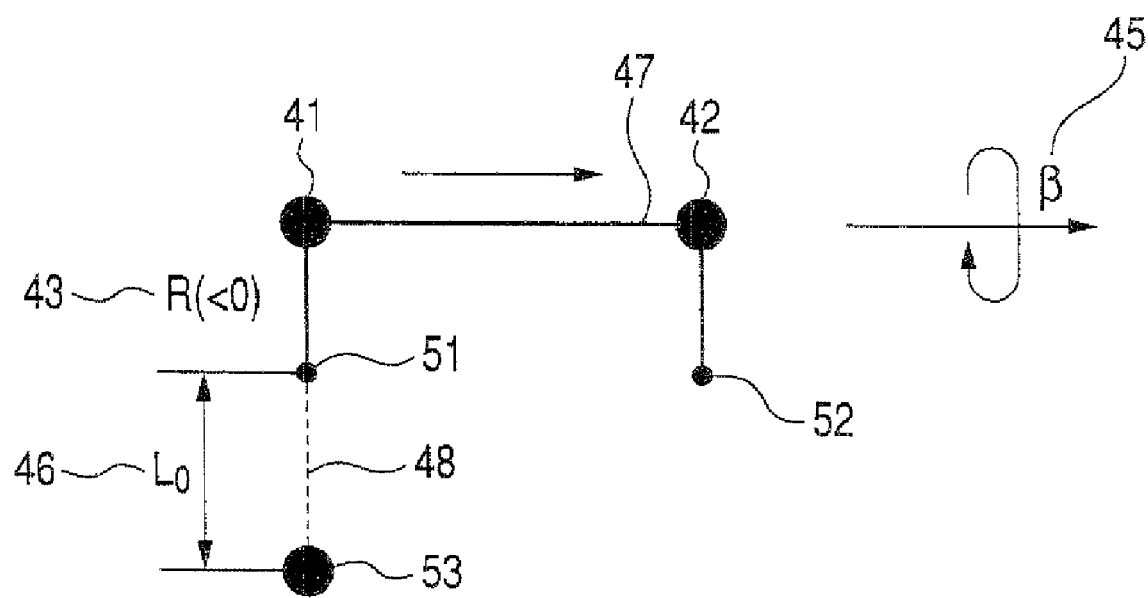

FIG. 18 is a diagram showing a U-shaped locus (step S04) including three lines perpendicular to each other which are generated by the laser locus calculator 26 (shown in FIG. 12). When the circular arc angle α is 0 in FIG. 13, it is not possible to make a circular arc using the first focal position 41 or the second focal position 42 as the end point. Intuitively, it is an image that the center of the circular arc exists but the portion of the circular arc disappeared. Therefore, when the circular arc angle α is 0, three line locuses perpendicular to each other are made as shown in FIG. 18. As described above, the direction of the line using the first focal position 41 and the second focal position 42 as the end points can be changed by specifying the positive and negative of the circular arc radius R. In FIG. 18, (a) is when the circular arc radius R is positive and (b) is when the circular arc radius R is negative.

Figure 19A:
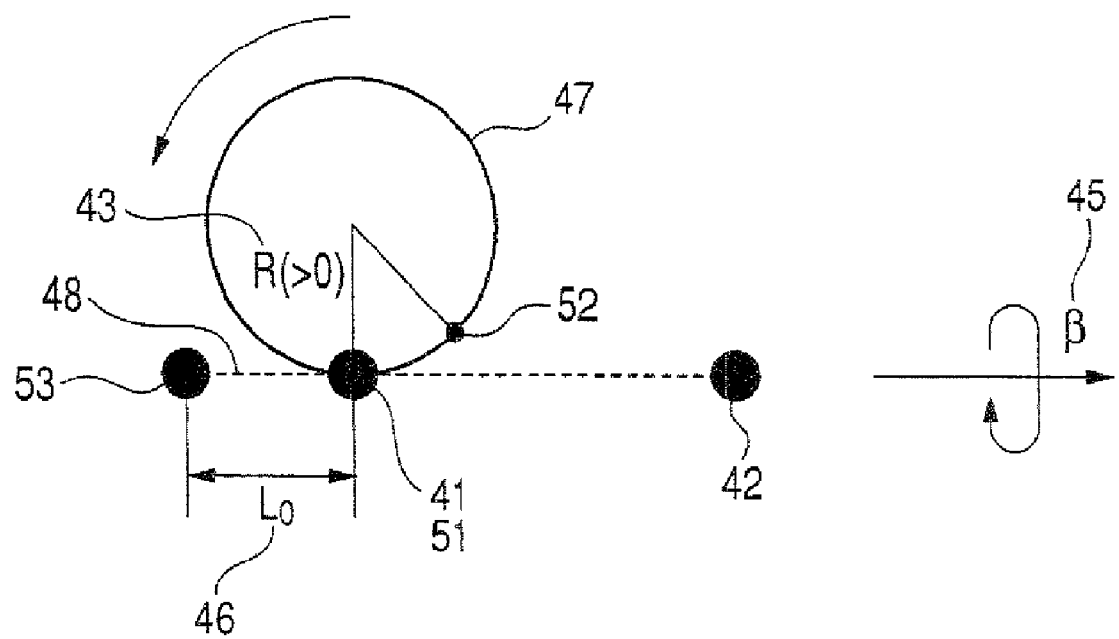
[FIG. 19]
Figure 19B:
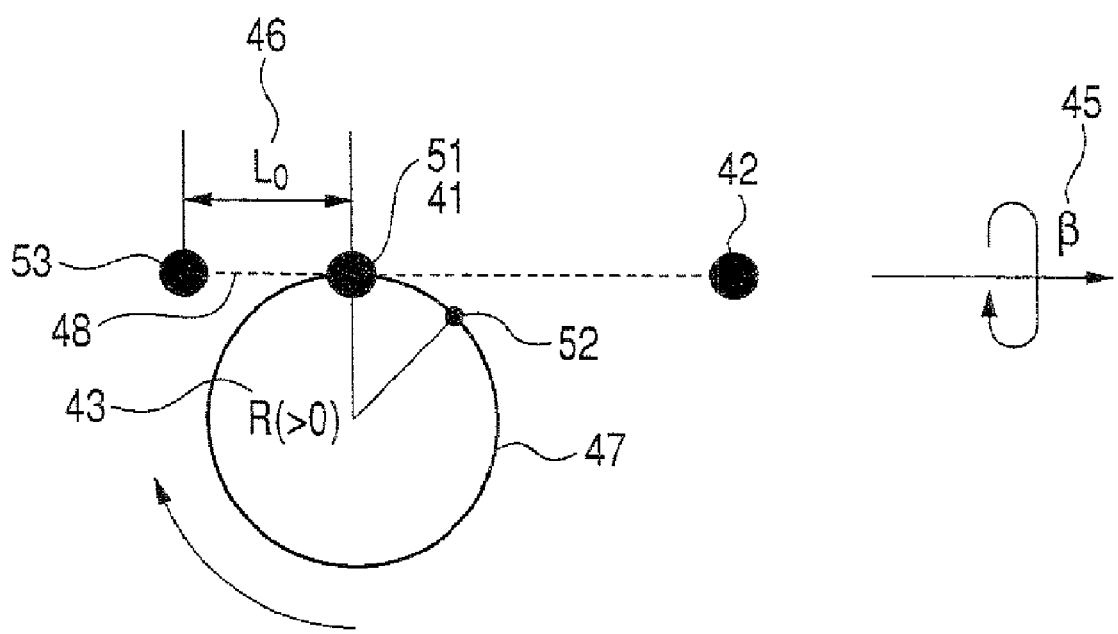
Figure 20:
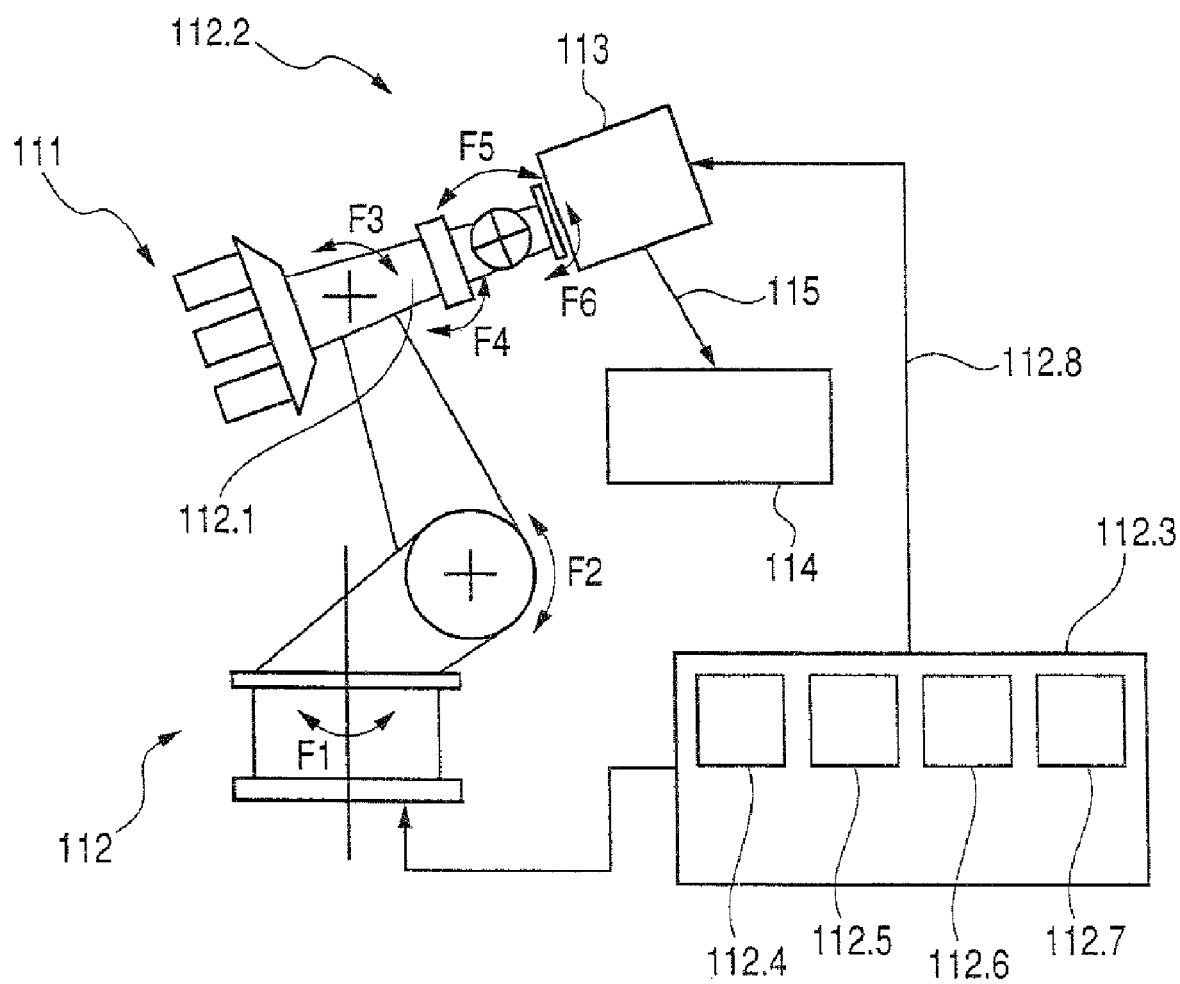
[FIG. 20]
Figure 21:
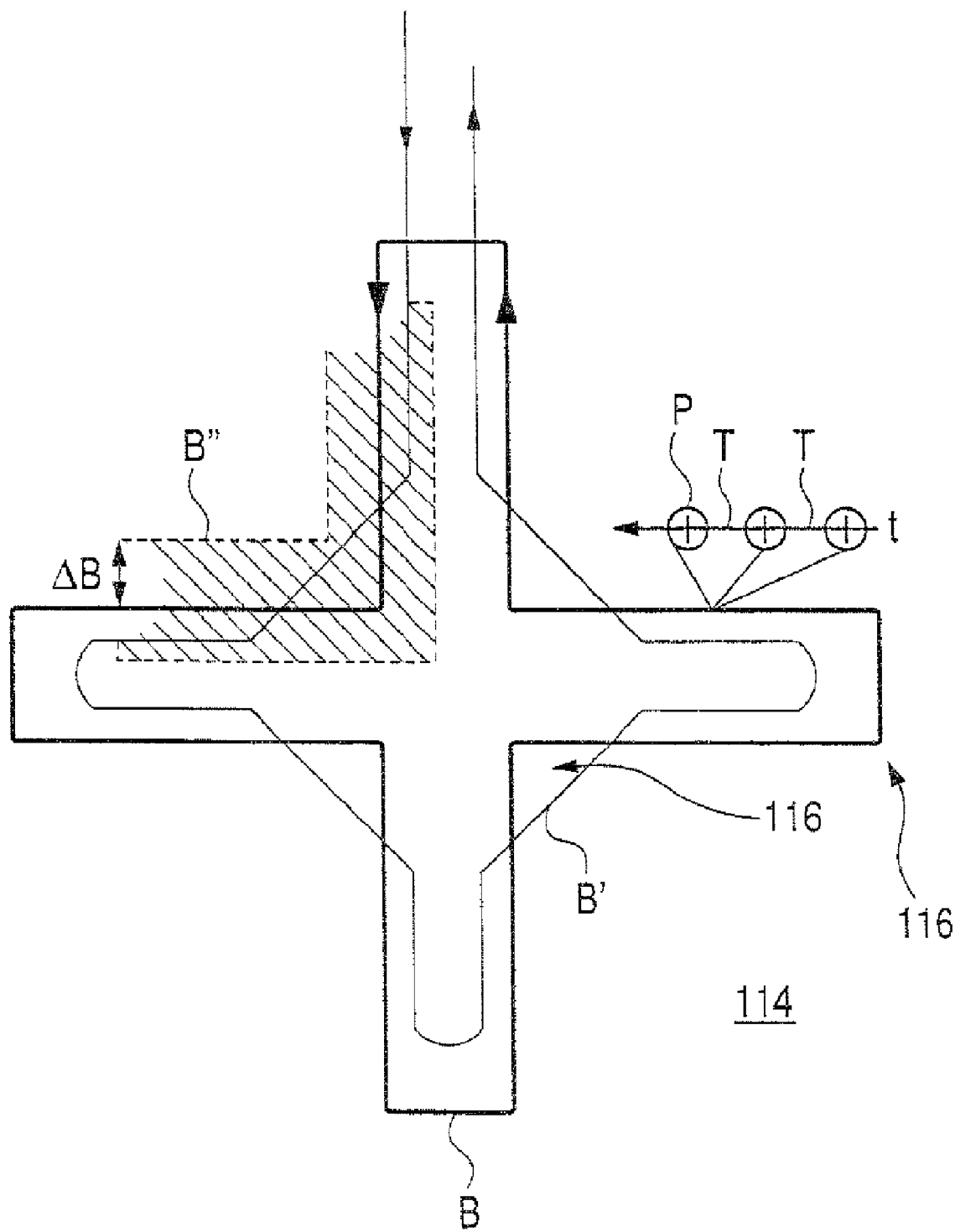
[FIG. 21]

FIG. 19 is a diagram showing one circle locus (step S06) generated by the laser locus calculator 26 (shown in FIG. 12). When the circular arc angle α is 360° or more in FIG. 13, a circle that the circular arc using the first focal position 41 as the end point is closed is made. Therefore, when the circular arc angle α is 360° or more, one circle locus is made as shown in FIG. 19. The portion of the circular arc angle α which is larger than 360° overlaps the locus of the circle. Although the laser-beam focal locus 47 is not drawn between the first focal position 41 and the second focal position 42, the second focal position 42 is necessary as an instruction point so as to determine the plane having the laser-beam focal locus 47. As described above, the direction of the circle is changed depending on the positive and negative of the circular arc radius R. In FIG. 19, (a) is when the circular arc radius R is positive, and (b) is when the circular arc R is negative.

As described above with reference to FIGS. 16 to 19, according to the invention, it is possible to generate the laser-beam focal locus other than the combination of the circular arc and the line due to the configuration of various parameters with respect to shapes, and thus it is possible to intuitively configure without extra adding the configuration item to the configuration screen as shown in FIG. 14.

As above, it is described about the case that the laser head 3 having two driving shafts as shown in FIG. 2 which turns the mirror 7 around axis X and axis Y. However, it is possible to provide the mechanism with a shaft which operates the lens shown in FIG. 2 along the traveling direction of the laser beam and add a mechanism which drives the shaft by using the laser head servo amplifiers. When the mechanism is used, it is possible to diversely change the distance in the range of the laser head 3 to the focal position W by moving the lens case by case. Therefore, the degree of freedom with respect to the laser welding processing using the robot system is improved.

Additionally, the invention is not limited to the laser welding, but needless to say may be widely applied to the use of the laser processing such as a laser cutting using the robot.

This application claims the benefit of Japanese Patent application No. 2005-243351 filed Aug. 24, 2005, the entire contents of which are incorporated herein by reference.

INDUSTRIAL APPLICABILITY

The invention can be applied to a robot system to which a tool having a driving shaft is fitted.

The invention claimed is:
1. A robot system comprising:
a robot including a first plurality of driving shafts;
a tool which is fitted on a front end portion of the robot and includes a second plurality of driving shafts for driving different parts of the tool;
a robot control device which controls the driving shafts of the robot and the driving shafts of the tool, the robot control device including a robot shaft calculator and a tool shaft calculator;
and a laser oscillator connected to the tool, wherein:
the robot shaft calculator calculates, every control cycle, the position and posture of a coordinate system fixed to the tool as viewed in the robot coordinate system on the basis of the position and posture of a first tool coordinate system as viewed in the robot coordinate system, the position and posture of a second tool coordinate system as viewed in the robot coordinate system, and the times of control cycle, and the robot moves the tool with a drive of the first plurality of driving shafts of the robot, the laser oscillator outputs a laser beam, which is incident on the tool and directed to an object using a drive of the second plurality of driving shafts of the tool, and the robot control device controls the first plurality of driving shafts of the robot and the second plurality of driving shafts of the tool in synchronization with each other,
and a focal position of the laser beam is calculated based on calculating a radiation start position of the laser beam and a radiation end position of the laser beam as viewed in the robot coordinate system,
wherein:
the tool shaft calculator includes
a position calculating section which calculates the radiation start position of the laser beam as viewed in the robot coordinate system fixed to the base of the robot and which calculates the radiation end position of the laser beam as viewed in the robot coordinate system on the basis of a position and posture of the second tool coordinate system, which is fixed to the position of the tool at the time of instructing the radiation end position of the laser beam, as viewed in the robot coordinate system and the focal position radiation end position of the laser beam as viewed in the second tool coordinate system;
a calculating section of times of control cycle which calculates a vector of the radiation area and the times of control cycle on the basis of the radiation start position, the radiation end position, and the moving speed of the focal position of the laser beam in the radiation area of the laser beam; and
a laser position instruction generating section which calculates the focal position of the laser beam every control cycle as viewed in the coordinate system fixed to the tool on the basis of the position and posture of the robot coordinate system fixed to the tool every control cycle as viewed in the robot coordinate system the vector of the radiation area, and the times of control cycle, and on the basis of the radiation start position as viewed in the robot coordinate system.

2. The robot system according to claim 1, wherein the tool includes a lens which is disposed in a traveling path of the laser beam, and the lens is moved in an axial direction of the lens using the second plurality of driving shafts, wherein the axial direction of the lens is a traveling direction of the laser beam, and
the robot control device controls a focal position of the laser beam by driving the second plurality of driving shafts of the tool to operate the lens.

3. The robot system according to claim 1, wherein the tool includes a mirror which is disposed in a traveling path of the laser beam and the mirror is rotated using the second plurality of driving shafts of the tool, and
the robot control device controls a focal position of the laser beam by driving the second plurality of driving shafts of the tool to rotate the mirror.

4. The robot system according to claim 3,
wherein an initial position of a control point of the robot is configured to be a rotation center of the mirror, and the robot
robot shaft calculator calculates a position of the control point of the robot, and the tool shaft calculator calculates an operation instruction transmitted to the second plurality of driving shafts of the tool from the position of the control point of the robot and a preset focal position of the laser beam.

5. The robot system according to claim 4, wherein the robot control device includes:
a manipulator file storage for storing the position of the control point of the robot and the focal position of the laser beam.

6. The robot system according to claim 1, wherein the robot control device includes a start command for starting the radiation of the laser beam and an end command for ending the radiation, and
the start command sets an interpolation method and a moving speed of the focal position of the laser beam in a radiation area.

7. The robot system according to claim 6, wherein at least one of the start command and the end command changes an output instruction value transmitted to the laser oscillator from a first value to a second value at a predetermined time.

8. The robot system according to claim 1, wherein the first plurality of driving shafts and the second plurality of driving shafts start and stop at substantially the same time.

9. The robot system according to claim 1, wherein the tool shaft calculator generates a locus of the focal position of the laser beam including a combination of two circular arcs and one line on the basis of two instructed focal position of the laser beam and a radius and an angle of a circular arc using the specified focal positions of the laser beam as end points.

10. The robot system according to claim 9, wherein the tool shaft calculator generates the locus based on a slope of a plane including the specified locus.

11. The robot system according to claim 9, wherein the tool shaft calculator generates the locus including the combination of two circular arcs and one line on the basis of a radius and an angle of a first circular arc using one of the two instructed focal positions of the laser beam as an end point and a radius and an angle of a second circular arc using the other instructed focal position of the laser beam as an end point.

12. The robot system according to claim 9, wherein the tool shaft calculator calculates a position of the tool such that the laser beam generates the locus.

13. The robot system according to claim 9, wherein the tool shaft calculator generates an auxiliary point apart from a start point of the locus by a specified distance in the front of the start point, and adds an auxiliary locus, which connects the auxiliary point to the start point, to the locus.

14. The robot system according to claim 9, wherein the tool shaft calculator generates an auxiliary point apart from an end point of the locus by a specified distance in the back of the end point and adds an auxiliary locus, which connects the auxiliary point to the end point, to the locus.

15. The robot system according to claim 9, wherein the tool shaft calculator calculates the shape of the generated locus by the specified radius and angle of the circular arc.

16. The robot system according to claim 15, wherein the tool shaft calculator calculates a line as the generated locus when the radius of the specified circular arc is 0.

17. The robot system according to claim 15, wherein the tool shaft calculator calculates the generated locus as a U-shape when the angle of the specified circular arc is 0 degrees.

18. The robot system according to claim 15, wherein the tool shaft calculator calculates a circle as the generated locus when the angle of the specified circular arc is 360 degrees or more.

* * * * *